United States Patent
Oishi

(10) Patent No.: US 9,626,006 B2
(45) Date of Patent: Apr. 18, 2017

(54) INFORMATION PROCESSING APPARATUS AND IMAGE FORMING APPARATUS

(71) Applicant: Oki Data Corporation, Tokyo (JP)

(72) Inventor: Keiko Oishi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/220,024

(22) Filed: Mar. 19, 2014

(65) Prior Publication Data
US 2014/0285439 A1 Sep. 25, 2014

(30) Foreign Application Priority Data
Mar. 21, 2013 (JP) .................................. 2013-058798

(51) Int. Cl.
| | |
|---|---|
| *G06F 3/041* | (2006.01) |
| *G06F 3/02* | (2006.01) |
| *G03G 15/00* | (2006.01) |
| *G06F 3/023* | (2006.01) |
| *G06F 3/0488* | (2013.01) |

(52) U.S. Cl.
CPC ......... *G06F 3/0219* (2013.01); *G03G 15/502* (2013.01); *G06F 3/0235* (2013.01); *G06F 3/04886* (2013.01); *G06F 2203/04808* (2013.01)

(58) Field of Classification Search
CPC combination set(s) only.
See application file for complete search history.

(56) References Cited

U.S. PATENT DOCUMENTS

| | | | |
|---|---|---|---|
| 6,256,040 B1* | 7/2001 | Tanaka | A63F 13/10 345/421 |
| 2007/0063959 A1* | 3/2007 | Iwabuchi | G09G 3/2074 345/100 |
| 2011/0018806 A1* | 1/2011 | Yano | G06F 3/0488 345/163 |
| 2012/0212438 A1* | 8/2012 | Vaisanen | G06F 3/0486 345/173 |

FOREIGN PATENT DOCUMENTS

| | | |
|---|---|---|
| JP | H02-236609 A | 9/1990 |
| JP | H06-102988 A | 4/1994 |
| JP | 2002-297292 A | 10/2002 |
| JP | 2003-271294 A | 9/2003 |
| JP | 2006-072892 A | 3/2006 |
| JP | 2007-156991 A | 6/2007 |
| JP | 2009-129443 A | 6/2009 |
| JP | 2009-169456 A | 7/2009 |
| JP | 2011-518375 A | 6/2011 |
| JP | 2012-198750 A | 10/2012 |
| JP | 2012-221219 A | 11/2012 |
| JP | 2013-192071 A | 9/2013 |

* cited by examiner

*Primary Examiner* — Van Chow
(74) *Attorney, Agent, or Firm* — Rabin & Berdo, P.C.

(57) ABSTRACT

An image processing apparatus including a first region, and a first display portion provided in the first region. The first display portion is configured so that a key for an operation is displayed on the first display portion. The image processing apparatus further includes a second region provided outside the first region. The second region is configured to receive an operation. The image processing apparatus includes a second display portion configured to display information based on the operation on the first display portion and the operation on the second region.

44 Claims, 29 Drawing Sheets

TOUCH SHIFT KEY

FIG. 5A  FIG. 5B  FIG. 5C
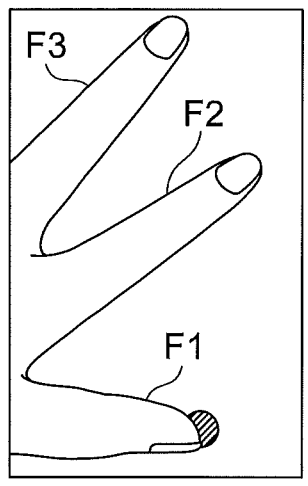
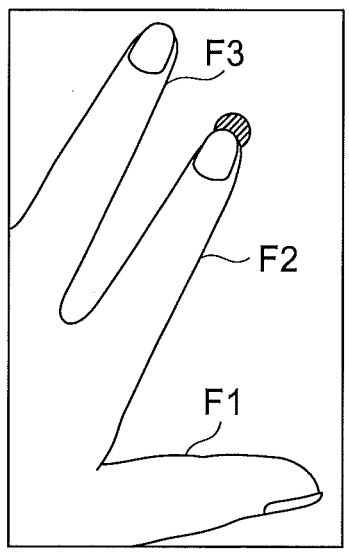
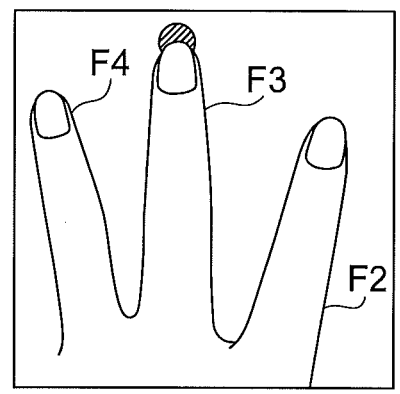
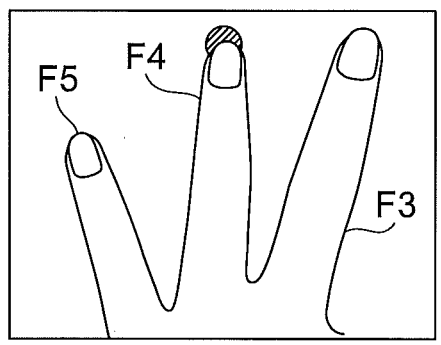
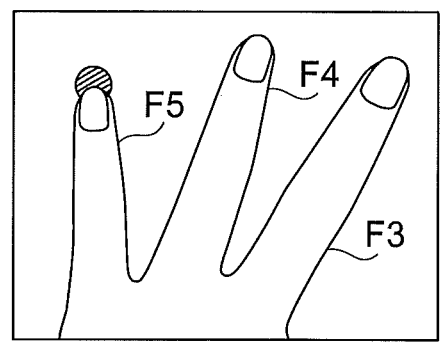
FIG. 5D  FIG. 5E

KEYSET OF SMALL LETTERS

KEYSET OF CAPITAL LETTERS

| INDEX / ARRAY | 0 | 1 | 2 | 3 |
|---|---|---|---|---|
| q KEY | q | Q | た | タ |

INFORMATION PROCESSING APPARATUS AND IMAGE FORMING APPARATUS

BACKGROUND OF THE INVENTION

The present invention relates to an image processing apparatus and an image forming apparatus having a key for an operation.

There is known an image processing apparatus having a key operated by a user. Such an image processing apparatus is disclosed in, for example, Japanese Laid-open Patent Publication No. 2006-72892 (see, [0011] to [0014] and FIG. 1).

Recently, there is a demand for enhancing operability when a user operates the key.

SUMMARY OF THE INVENTION

An aspect of the present invention is intended to provide an image processing apparatus and an image forming apparatus capable of enhancing operability in operating a key.

According to an aspect of the present invention, there is provided an image processing apparatus including a first region, and a first display portion provided in the first region. A key for an operation is displayed on the first display portion. The image processing apparatus further includes a second region provided outside the first region. The second region is configured to receive an operation. The image processing apparatus further includes a second display portion configured to display information based on the operation on the first display portion and the operation on the second region.

With such a configuration, it becomes possible to enhance operability in operating the key.

According to another aspect of the present invention, there is provided an image forming apparatus configured as the above described image processing apparatus.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIGS. 5A through 5E are schematic views for illustrating a state where a user operates the touch panel according to the first embodiment;

FIGS. 14A and 14B are schematic views showing a modification of the image processing apparatus according to the first embodiment;

DETAILED DESCRIPTION OF THE PREFERRED EMBODIMENT

Hereinafter, embodiments of the present invention will be described with reference to the attached drawings.

First Embodiment

Figure 1:
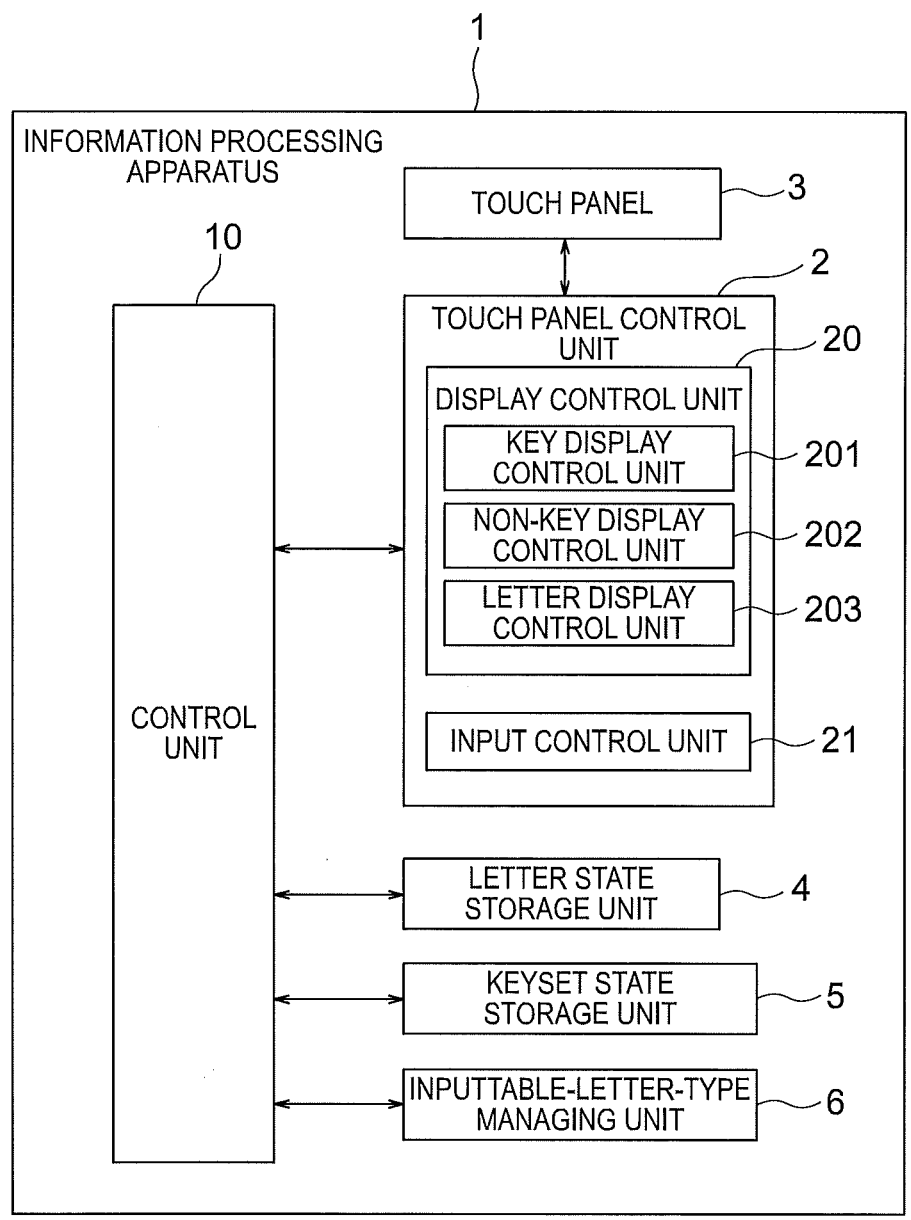
FIG. 1 is a block diagram showing a configuration of an image processing apparatus according to the first embodiment of the present invention.

FIG. 1 is a block diagram showing a configuration of an image processing apparatus 1 according to the first embodiment of the present invention. The image processing apparatus 1 is, for example, an image forming apparatus (such as a printer, a copier, a multifunction peripheral or the like), a cellular phone, a PDA (Personal Digital Assistance) or the like. The image processing apparatus 1 has a touch panel 3, and is configured to perform a certain operation according to an operation by a user on the touch panel 3.

The image processing apparatus 1 includes the touch panel 3, a control unit 10, a touch panel control unit 2 (i.e., an input control unit), a letter state storage unit 4, a key set state storage unit 5, and an inputtable-letter-type managing unit 6. These components can be implemented by hardware such as electronic circuits or the like, or can be implemented by programs installed in a computer.

The control unit 10 is configured to control an entire operation of the image, processing apparatus 1. The control unit 10 includes, for example, a CPU (Central Processing Unit), RAM and ROM (i.e., program memories), a timer counter and the like.

The touch panel 3 is configured to receive an operation by the user for the image processing apparatus 1. The touch panel 3 includes a display unit such as an LCD (Liquid Crystal Display). When a surface of the touch panel 3 is touched, the touch panel 3 outputs signal (for example, coordinates in a lateral direction and in a vertical direction) corresponding to a touched position.

In this embodiment, the touch panel 3 is configured to detect multi-touch input. In other words, when two or more positions on the touch panel 3 are touched at the same time, the touch panel 3 outputs information of respective touched positions. In this regard, an image processing apparatus using a touch panel 3 which does not detect the multi-touch input will be described in the second embodiment.

The touch panel control unit 2 is configured to control a display on the touch panel 3, and sends operation signal (in response to a touch operation by the user on the touch panel 3) to the control unit 10. The touch panel control unit 2 includes a display control unit 20 that controls the display on the touch panel 3, and an input control unit 21 that detects a touch operation (i.e., input) on the touch panel 3.

Figure 2:
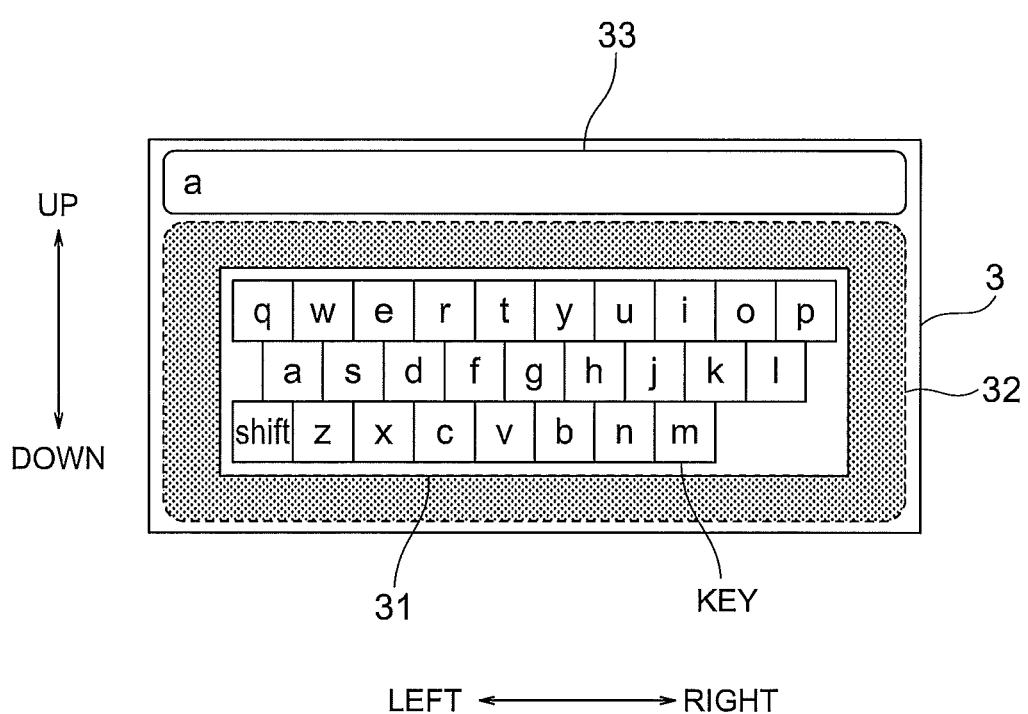
FIG. 2 is a schematic view showing an example of a display on a touch panel according to the first embodiment.

FIG. 2 is a view showing an example of the display on the touch panel 3 (i.e., an example of an operation screen). In FIG. 2, a vertical direction and a lateral direction (respectively indicated by arrows) are defined based on a user that faces the touch panel 3. In this regard, the vertical direction and the lateral direction are defined based on a letter inputted by a key.

The touch panel 3 includes a key display portion 31 (i.e., a first display portion), a non-key display portion 32 (i.e., a third display portion) and a letter display portion 33 (i.e., a second display portion).

The key display portion 31 (i.e., the first display portion) is disposed in a first region of the touch panel 3. The first region is a substantially center of the touch panel 3. However, the first region is not limited to the substantially center of the touch panel 3. The key display portion 31 includes a plurality of keys (i.e., software keys) for inputting.

For convenience of explanation, the key display portion 31 includes 24 letter keys representing alphabetical letters and a shift key. The shift key is operated to switch between a capital letter and a small letter. The letter keys and the shift key are collectively referred to as a keyset. The keyset displayed on the key display portion 31 is not limited to a combination of the letter keys and the shift key. Any keys can be displayed on the key display portion 31.

The non-key display portion 32 (i.e., the third display portion) is disposed in a second region outside the key display portion 31 (i.e., the first region). In this example, the non-key display portion 32 is disposed so as to surround the key display portion 31. In other words, the non-key display portion 32 is disposed on upper, lower, right and left sides of the key display portion 31. Such an arrangement is effective in enhancing operability. The non-key display portion 32 has no key for inputting, but is configured to receive a touch operation by the user.

In this embodiment, as shown in FIG. 2, an indication (i.e., a name) of a function of the non-key display portion 32 is not provided on the second region. However, it is also possible to provide an indication "Converting Portion" on the non-key display portion 32 of the second region so that the user can easily recognize the function of the non-key display portion 32.

The letter display portion 33 is disposed in a region (i.e., a third region) other than regions where the key-display portion 31 and the non-key display portion 32 are disposed. In this example, the letter display portion 33 is disposed on an upper part of the touch panel 3. The letter display portion 33 is configured to display information (i.e., a letter) in response to an operation on the non-key display portion 32.

Referring back to FIG. 1, the display control unit 20 of the touch panel control unit 2 includes a key display control unit 201, a non-key display control unit 202, and a letter display control unit 203. The key display control unit 201 is configured to control a display on the key display portion 31 of the touch panel 3. The non-key display portion 202 is configured to control a display on the non-key display portion 32 of the touch panel 3. The input control unit 21 of the touch panel control unit 2 detects a touch operation on the touch panel 3, and sends signal to the control unit 10.

The letter state storage unit 4 (i.e., a state information storage unit) is configured to hold (i.e., store) state information of a letter (i.e., displayed information). In this example, the state information is information on letter types, i.e., a capital letter or a small letter. The keyset state storage unit 5 (i.e., a key information storage unit) is configured to hold state information of the keyset currently displayed on the key display portion 31. The inputtable-letter-type managing unit 6 (i.e., an information managing unit) is configured to hold letter types for each key of the key display portion 31 while associating the letter types with the respective state information.

Figure 3A:
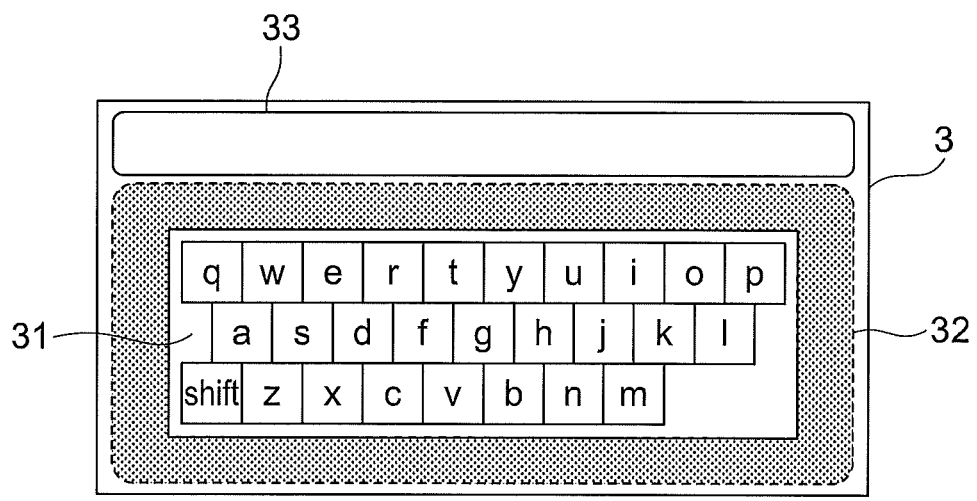
FIGS. 3A and 3B are schematic views showing an operation of a shift key displayed on the touch panel according to the first embodiment.
Figure 3A:
Figure 3B:
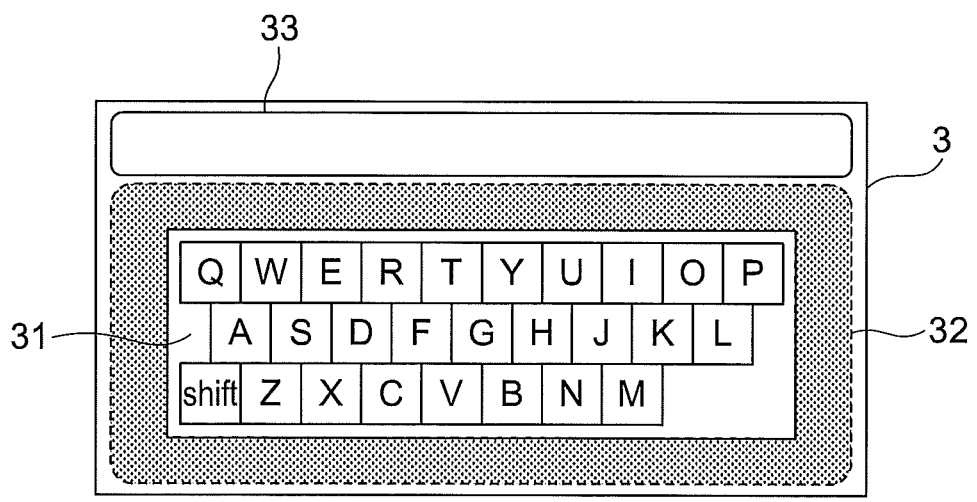

FIGS. 3A and 3B are schematic views showing an operation of the shift key displayed on the key display portion 31 of the touch panel 3. Here, the key display portion 31 displays a keyset of small alphabetical letters as shown in FIG. 3A. In this state, when the input control unit 21 detects a touch operation on the shift key, the key display control unit 201 changes the keyset displayed on the key display portion 31 to a keyset of capital alphabetical letters as shown in FIG. 3B. That is, every time the input control unit 21 detects a touch operation on the shift key, the key display portion 201 switches between the keysets of the small letters and the capital letters.

Figure 4A:
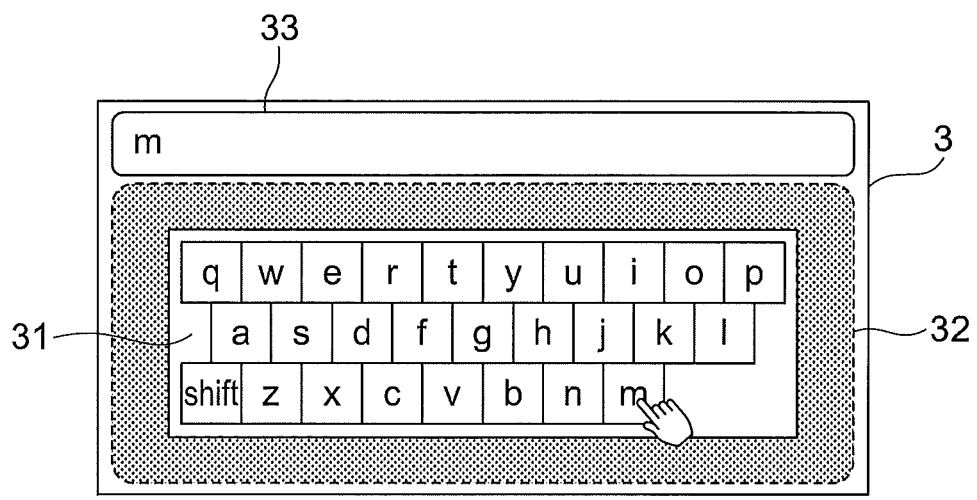
FIGS. 4A and 4B are schematic views showing an example of an operating method of the touch panel according to the first embodiment.
Figure 4B:
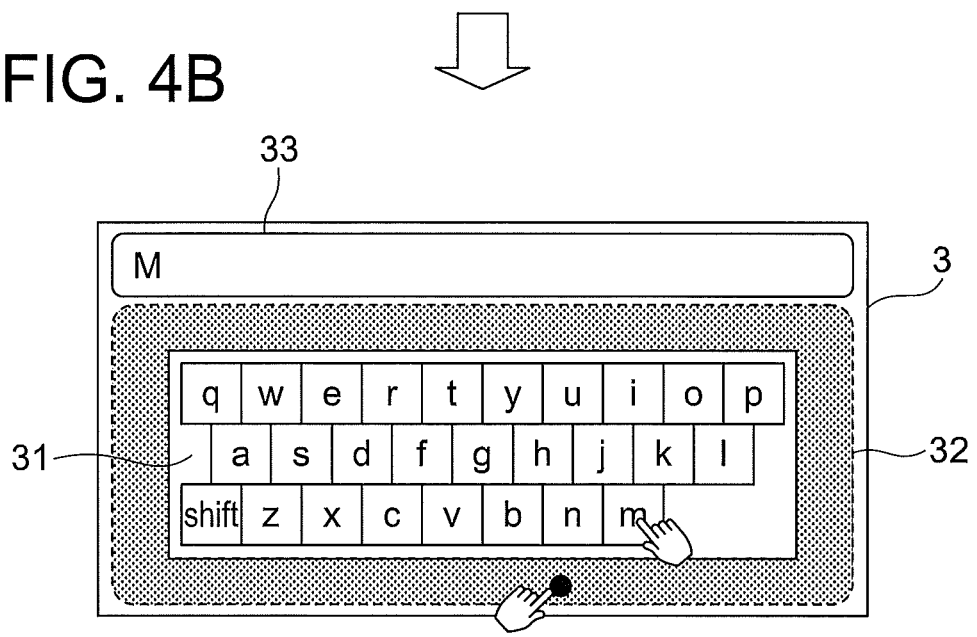

FIGS. 4A and 4B are schematic views showing an operating method of the touch panel 3. When the input control unit 21 detects a touch operation (i.e., a first touch operation) on an "m" key in a state where the key display portion 31 displays the keyset of small letters as shown in FIG. 4A, the letter display control unit 203 causes the letter display portion 33 to display a small letter "m".

Further, when the input control unit 21 detects a touch operation (i.e., a second touch operation) on the non-key display portion 32 as shown in FIG. 4B in a state where the input control unit 21 continuously detects the first touch operation on the "m" key, the letter display control unit 203 causes the letter display portion 33 to display a capital letter "M" in place of the small letter "m".

Further, when the input control unit 21 detects another touch operation (i.e., a third touch operation) on the non-key display portion 32, the letter display control unit 203 causes the letter display portion 33 to display the small letter "m" in place of the capital letter "M".

When the user releases his/her finger from the "m" key (i.e., when the input control unit 21 does not detect the touch operation on the "m" key), the letter display control unit 203 determines the letter displayed on the letter display portion 33.

In this way, the letter types (i.e., the capital letter and the small letter) can be switched as many times as needed until the input control unit 21 does not detect the touch operation on the "m" key. When the input control unit 21 does not detect the touch operation on the "m" key, the inputted letter is determined.

FIGS. 5A, 5B, 5C, 5D and 5E are schematic views showing a state where the user operates the touch panel 3. FIG. 5A shows a state where the user touches any key of the key display portion 31 with a thumb F1 of a left hand. FIG. 5B shows a state where the user touches any key of the key display portion 31 with an index finger F2 of the left hand. FIGS. 5C, 5D and 5D respectively show states where the user touches any key of the key display portion 31 with a middle finger F3, a medicinal finger F4, and a little finger F5 of the left hand.

As shown in FIG. 5A, when the thumb F1 of the left hand touches the key, the index finger F2 and the middle finger F3 lie above a position where the thumb F1 touches the key. As shown in FIG. 5B, when the index finger F2 of the left hand touches the key, the thumb F1 lies below a position where the index finger F2 touches the key. As shown in FIGS. 5C, 5D and 5E, when the middle finger F3, the medicinal finger F4 or the little finger F5 of the left hand touches the key, the thumb F1 lies on a right side of or below a position where the finger F3, F4 or F5 touches the key.

Further, when FIGS. 5A, 5B, 5C, 5D and 5E are inverted in the lateral direction, they show states where the user touches any key of the key display portion 31 with fingers of a right hand.

In this way, when the non-key display portion 32 is disposed so as to surround (i.e., disposed on upper, lower, right and left sides of) the key display portion 31, the user can touch any key of the key display portion 31 with a finger of the left or right hand, and then easily touch the non-key display portion 32 with another finger without separating the finger from the key.

Figure 6A:
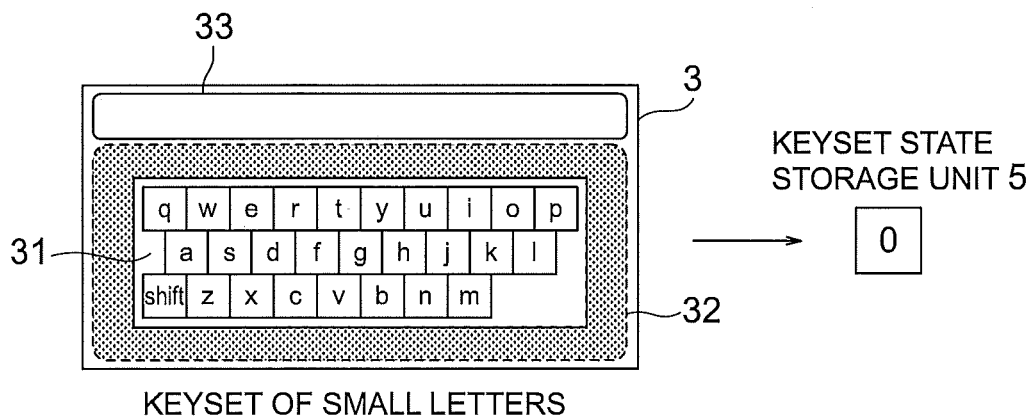
FIGS. 6A and 6B are schematic views for illustrating state information held by a keyset state storage unit according to the first embodiment.
Figure 6B:
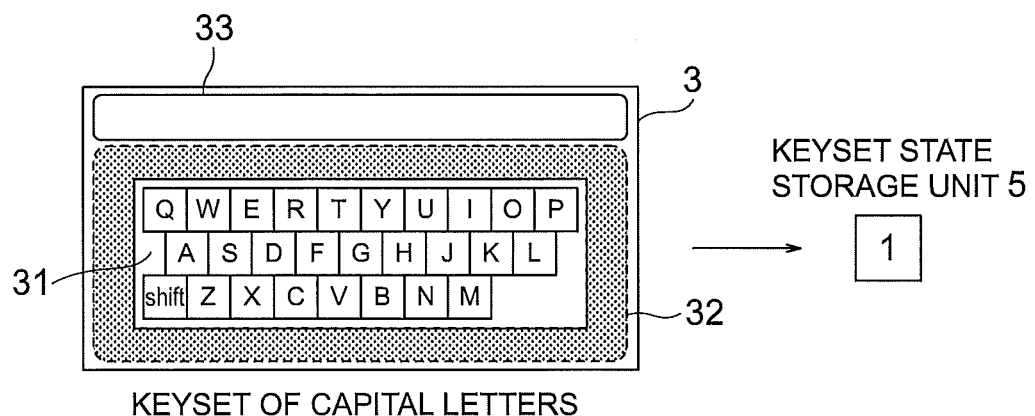

FIGS. 6A and 6B are schematic views showing state information held by the keyset state storage unit 5. The keyset state storage unit 5 holds the state information of the keyset currently displayed on the key display portion 31. The state information is expressed using 0 and a positive number (for example, 1). In this embodiment, the state information "0" represents a small letter, and the state information "1" represents a capital letter.

That is, when the keyset of small letters is displayed on the key display portion 31 as shown in FIG. 6A, the keyset state storage unit 5 holds the state information "0". In contrast, when the keyset of capital letters is displayed on the key display portion 31 as shown in FIG. 6B, the keyset state storage unit 5 holds the state information "1".

Further, the keyset state storage unit 5 updates the state information (held by the keyset state storage unit 5) every time the key display control unit 201 updates the display on the key display portion 31 in response to the operation on the shift key.

That is, when the shift key is operated (touched) in a state shown in FIG. 6A, the key display control unit 201 changes the display (i.e., the keyset of the small letters) on the key display portion 31 to the keyset of the capital letters. At the same time, the keyset state storage unit 5 updates the state information from "0" to "1". Similarly, when the shift key is operated in a state shown in FIG. 6B, the key display control unit 201 changes the display (i.e., the keyset of the capital letters) on the key display portion 31 to the keyset of the small letters. At the same time, the keyset state storage unit 5 updates the state information from "1" to "0".

The letter state storage unit 4 holds the state information of the letter inputted using the key (i.e., the letter key) of the key display portion 31 as described above. The state information held by the keyset state storage unit 5 is copied, and the copied state information is stored in the letter state storage unit 4 at a predetermined timing as described later.

Figure 7:
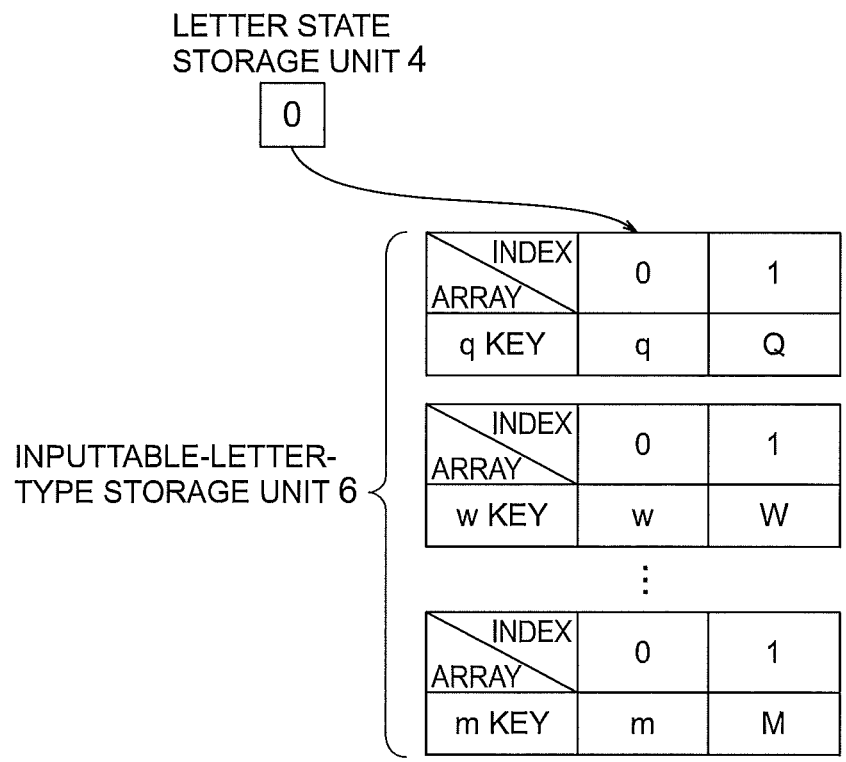
FIG. 7 is a schematic view showing an example of information held by an inputtable-letter-type managing unit according to the first embodiment.

FIG. 7 is a schematic view showing an example of information held by the inputtable-letter-type managing unit 6. The inputtable-letter-type managing unit 6 has arrays corresponding to respective keys displayed on the key display portion 31, and holds letters associated with indexes (0 and 1) in each array. For example, a small letter "q" associated with the index "0" and a capital letter "Q" associated with the index "1" are held in an array for a "q" key. The indexes correspond to the state information.

When the control unit 10 accesses the inputtable-letter-type managing unit 6, the control unit 10 uses the state information held by the letter state storage unit 4 as the index. For example, when the input control unit 21 detects a touch operation on the "q" key, the control unit 10 refers to the letter state storage unit 4 to acquire the state information "0", and accesses the array for the "q" key held by the inputtable-letter-type managing unit 6 using the state information "0" as the index. The control unit 10 acquires the small letter "q" corresponding to the state information (i.e., the index) "0". The control unit 10 outputs the small letter "q" to the letter display control unit 203. The letter display control unit 203 causes the letter display portion 33 to display the small letter "q".

Figure 8:
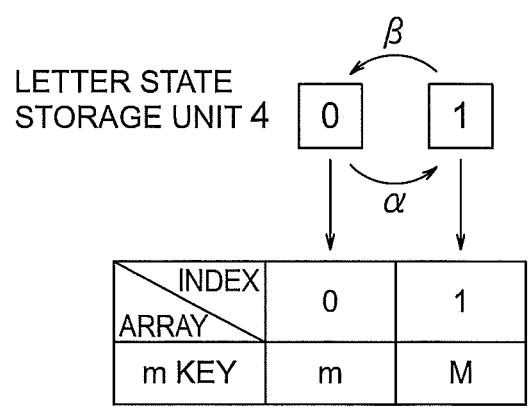
FIG. 8 is a schematic view for illustrating update processing according to the first embodiment.

FIG. 8 is a schematic view showing update processing to update the letter displayed on the letter display portion 33. When the input detection unit 21 detects a touch operation on the non-key display portion 32 while the input detection unit 21 is still detecting the touch operation on the key (for example, the "m" key), the control unit 10 updates the state information "0" stored in the letter state storage unit 4 by incrementing as shown by an arrow α. Then, the control unit 10 accesses the array for the "m" key held by the inputtable-letter-type managing unit 6 using the updated state information "1" as the index, and acquires the capital letter "M". If the state information reaches a maximum value, the state information returns to a minimum value when the state information is next updated. In this example, the state information includes "0" and "1". Therefore, if the state information reaches "1", the state information returns to "0" as shown by an arrow β when the state information is updated.

Figure 9:
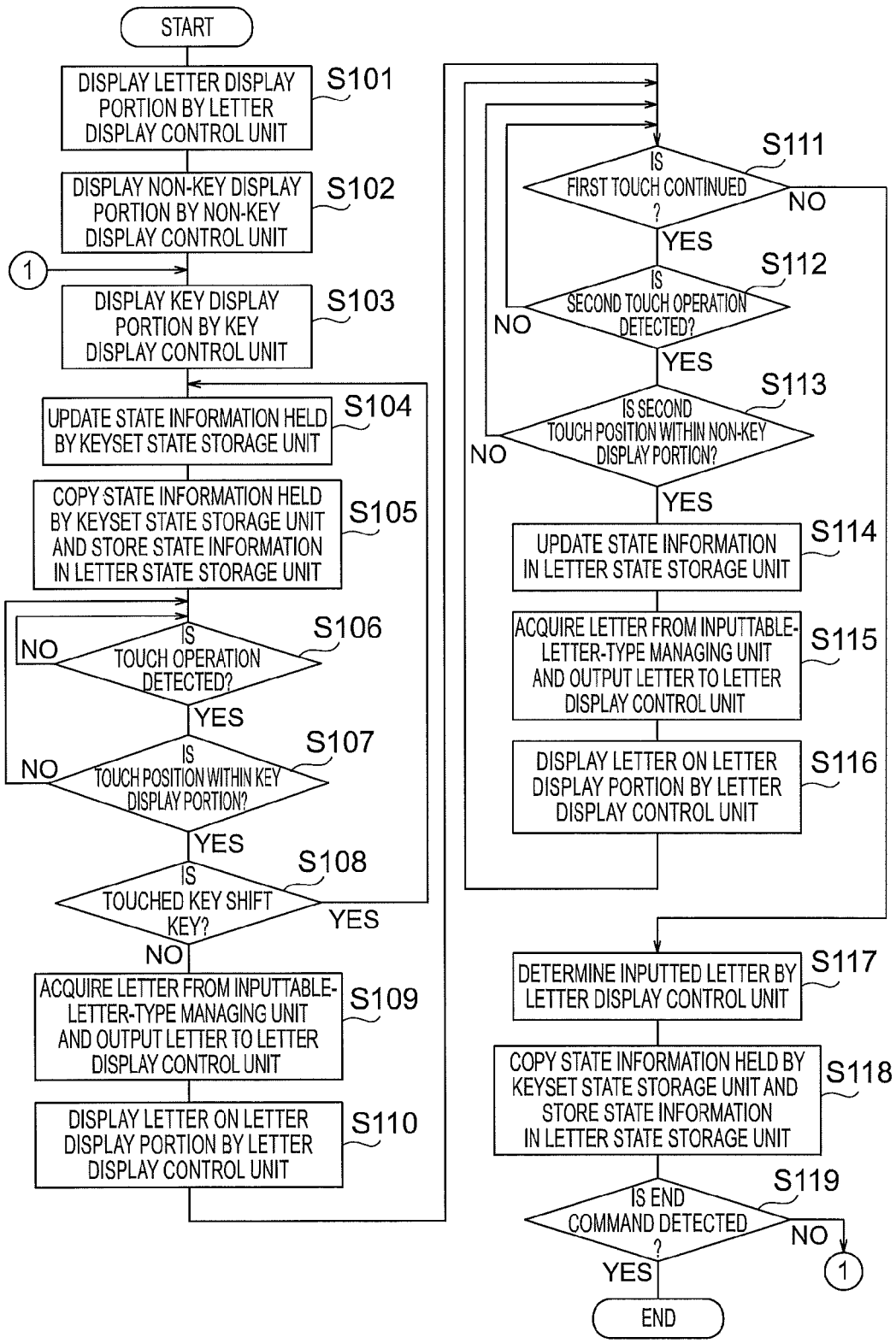
FIG. 9 is a flowchart for illustrating processing of the image processing apparatus according to the first embodiment.

FIG. 9 is a flowchart showing processing of the image processing apparatus 1 according to the first embodiment. The processing shown in FIG. 9 is performed by the control unit 10, and is also performed by the display control unit 20 (i.e., the key display control unit 201, the non-key display control unit 202 and the letter display control unit 203), the input control unit 21, the letter state storage unit 4, the keyset state storage unit 5 and the inputtable-letter-type managing unit 6 according to instruction of the control unit 10.

The processing shown in FIG. 9 is started by, for example, turning on a power switch of the image processing apparatus 1. First, the letter display control unit 203 of the display control unit 20 of the touch panel control unit 2 displays the letter display portion 33 on the touch panel 3 (step S101). The non-key display control unit 202 displays the non-key display portion 32 on the touch panel 3 (step S102). The key display control unit 201 displays the key display portion 31 on the touch panel 3 (step S103). The keyset described with reference to FIG. 2 is displayed on the key display portion 31.

Then, the keyset state storage unit 5 updates the state information (held by the keyset state storage unit 5) to that corresponding to a current display on the key display portion 31, and holds the updated state information (step S104). For example, in the case shown in FIG. 4A, the keyset of small letters is displayed on the key display portion 31, and therefore the keyset state storage unit 5 holds the state information "0".

Then, the control unit 10 copies the state information held by the keyset state storage unit 5, and stores the state information in the letter state storage unit 4 (step S105). For example, in the case shown in FIG. 4A, the keyset state storage unit 5 holds the state information "0", and therefore the control unit 10 copies the state information "0" and stores the state information "0" in the letter state storage unit 4. Therefore, the letter state storage unit 4 holds the state information "0".

Next, the control unit 10 judges whether the input control unit 21 detects a touch operation (i.e., a first touch operation) on the touch panel 3 (step S106). If the input control unit 21 detects the touch operation on the touch panel 3 (YES in step S106), the control unit 2 judges whether a position where a touch operation is detected (referred to as a first touch position) is within the key display portion 31 (step S107).

If the first touch position is within the key display portion 31 (YES in step S107), the control unit 10 judges whether a key (i.e., a touched key) corresponding to the first touch position is the shift key (step S108). If the touched key is the shift key (YES in step S108), the control unit 10 returns to step S103. If the touched key is not the shift key (NO in step S108), the control unit 10 accesses the array corresponding to the touched key held by the inputtable-letter-type managing unit 6 using the state information (held by the letter state storage unit 4) as the index, and acquires the letter to be displayed from the array. The control unit 10 outputs the acquired letter to the letter display control unit 203 (step S109). The letter display control unit 203 causes the letter display portion 33 to display the letter received from the control unit 10 (step S110).

For example, in the case shown in FIG. 4A, the key display control unit 201 causes the key display portion 31 to display the keyset of small letters, and the input control unit 21 detects the touch operation on the "m" key of the key display portion 31. In this case, the control unit 10 accesses the array corresponding to the "m" key held by the inputtable-letter-type managing unit 6 using the state information "0" (held by the letter state storage unit 4) as the index, and acquires the small letter "m" associated with the index "0". The control unit 10 outputs the acquired letter "m" to the letter display control unit 203. The letter display control unit 203 causes the letter display portion 33 to display the small letter "m".

Then, the control unit 10 judges whether the input control unit 21 is still detecting the first touch operation (step S111). If the input control unit 21 is still detecting the first touch operation (YES in step S111), the control unit 10 judges whether the input control unit 21 detects a next touch operation, i.e., a second touch operation (step S112). If the input control unit 21 detects the second touch operation (YES in step S112), the control unit 10 judges whether a position where the touch operation is detected (referred to as a second touch position) is within the non-key display portion 32 (step S113).

If the second touch position is within the non-key display portion 32 (YES in step S113), the control unit 10 updates the state information held by the letter state storage unit 4 (step S114).

For example, in the case shown in FIG. 4B, the input control unit 21 detects the touch operation on the non-key display portion 32 in a state where the input control unit 21 continuously detects the touch operation on the "m" key. In this case, the control unit 10 updates the state information held by the letter state storage unit 4 by incrementing. That is, the control unit 10 updates the state information held by the letter state storage unit 4 from "0" to "1".

Then, the control unit 10 refers to the inputtable-letter-type managing unit 6 using the updated state information (held by the letter state storage unit 4) as the index, and acquires the letter to be displayed from the array corresponding to the first touched key (i.e., the key on the first touch position). The control unit 10 outputs the acquired letter to the letter display control unit 203 (step S115).

The letter display control unit 203 causes the letter display portion 33 to display the letter received from the control unit 10 in place of the initially displayed letter (step S116).

For example, in the case shown in FIG. 4B, the control unit 10 accesses the array corresponding to the "m" key held by the inputtable-letter-type managing unit 6 as shown in FIG. 7 using the updated state information "1" as the index, and acquires the capital letter "M" corresponding to the state information "1" (i.e., the index). The control unit 10 outputs the acquired capital letter "M" to the letter display control unit 203. The letter display control unit 203 causes the letter display portion 33 to display the capital letter "M".

While the input control unit 21 continuously detects the first touch operation, the control unit 10 repeats the processing of the steps S111, S112, S113, S114, S115 and S116.

If the input control unit 21 does not detect the first touch operation (NO in step S111), the letter display control unit 203 determines the inputted character (step S117).

For example, in the case shown in FIG. 4B, if the user releases his/her finger from the "m" key (i.e., if the input control unit 21 does not detect the touch operation on the "m" key), the letter display control unit 203 determines the inputted character. Assuming that the non-key display portion 32 is touched once while the touching operation on the "m" key is continuously detected, the character displayed on the letter display portion 33 is determined to be "M".

Then, the control unit 10 copies the state information held by the keyset state storage unit 5, and stores the copied state information in the letter state storage unit 4 (step S118). That is, even when the letter state storage unit 4 has held the state information "1" by the touch operation on the non-key display portion 32, the copied stage information "0" is held by the letter state storage unit 4.

Then, the control unit 10 judges whether an end command (for example, turning off of the image processing apparatus 1) is received (step S119). If the control unit 10 detects the end command (YES in step S119), the control unit 10 ends the processing of FIG. 9. If the end command is note received (NO in step S119), the control unit 10 returns to the above described step S103.

As described above, according to the first embodiment of the present invention, the letter types of the letter displayed on the letter display portion 33 of the touch panel 3 can be switched (converted) by touching the non-key display portion 32 disposed outside the key display portion 31. It is not necessary for the user to operate the shift key or other exclusive key for switching the letter type. Therefore, switching of the letter types can be easily performed.

Further, since the non-key display portion 32 is disposed so as to surround the key display portion 31, it becomes easy for the user to touch the key display portion 31 with any finger of his/her hand, and to touch the non-key display portion 32 with another finger of the same hand.
Modifications.

In the touch panel 3 of the first embodiment, the non-key display portion 32 (i.e., the second region) is disposed on the upper, lower, right and left sides of the key display portion 31 (i.e., the first region). However, the first embodiment is not limited to such an arrangement. High operability can be achieved as long as the non-key display portion 32 is disposed on at least two regions among the upper, lower, right and left sides of the key display portion 31.

Figure 10:
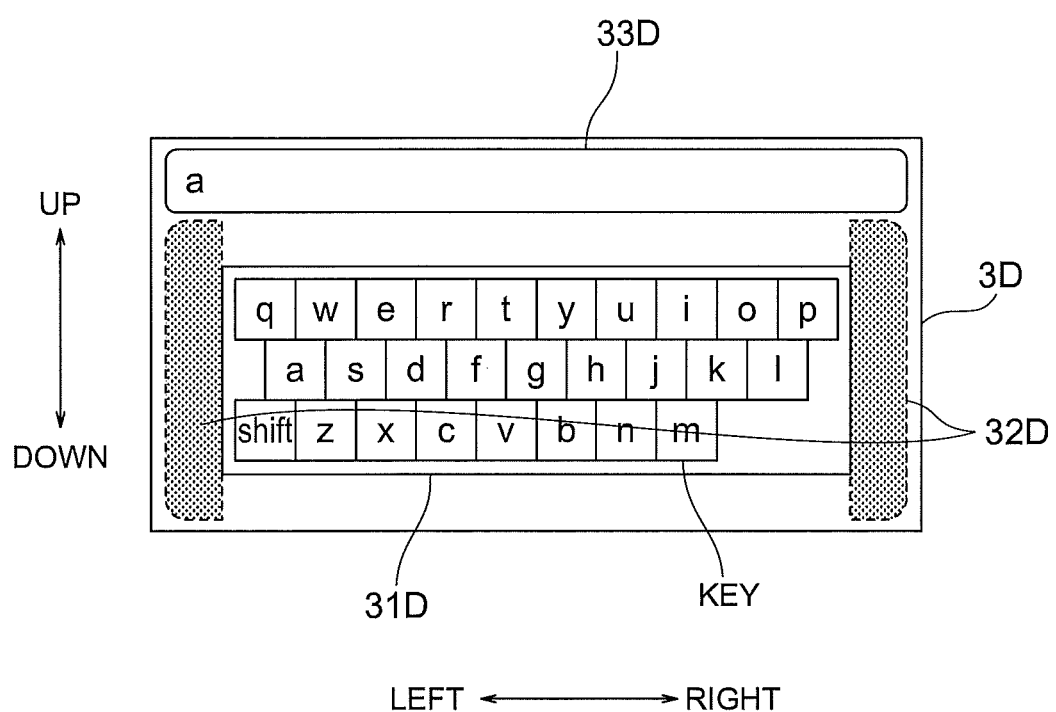
FIG. 10 is a schematic view showing a first modification of the touch panel according to the first embodiment.
Figure 11:
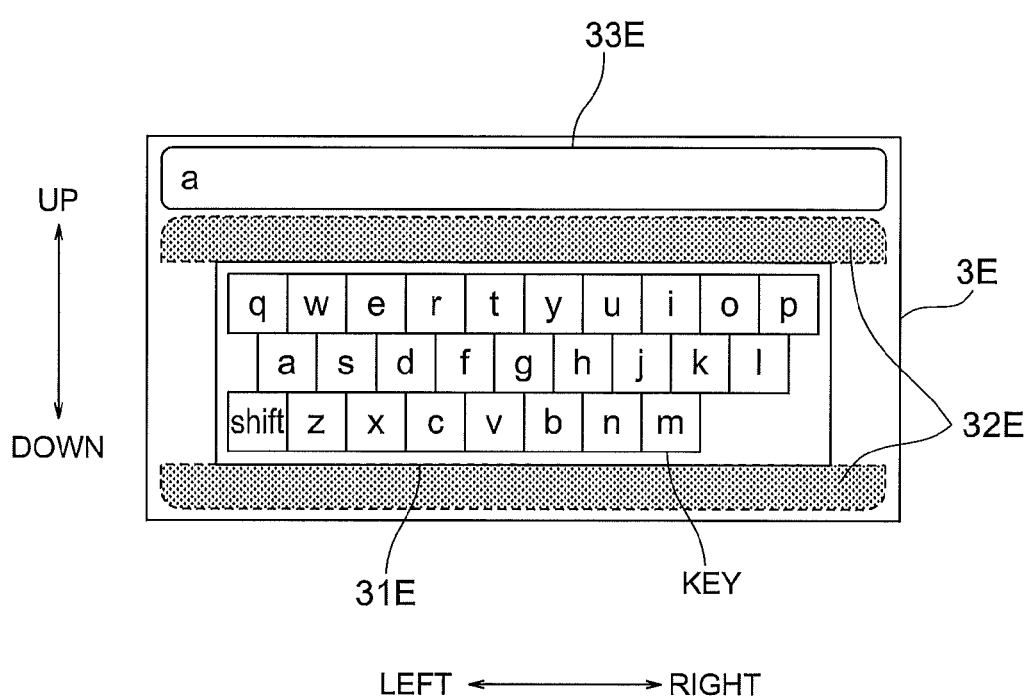
FIG. 11 is a schematic view showing a second modification of the touch panel according to the first embodiment.

For example, in a first modification shown in FIG. 10, the non-key display portions 32D of the touch panel 3D are disposed on the right and left sides of the key display portion 31D. In other words, the non-key display portions 32D are disposed on positions facing right and left edges (sides) of the key display portion 31D. Further, in a second modification shown in FIG. 11, the non-key display portions 32E of the touch panel 3E are disposed on the upper and lower sides of the key display portion 31E. In other words, the non-key display portions 32E are disposed on positions facing upper and lower edges of the key display portion 31E.

In the first and second modifications, the non-key display portions 32D (32E) as the second regions are disposed on two regions facing each other with the key display portion 31D (31E) being disposed therebetween. With such an arrangement, it becomes easy for the user to touch the key display portion 31D (31E) with any finger of the left or right hand, and to touch the non-key display portion 32D (32E) with another finger of the same hand.

Figure 12:
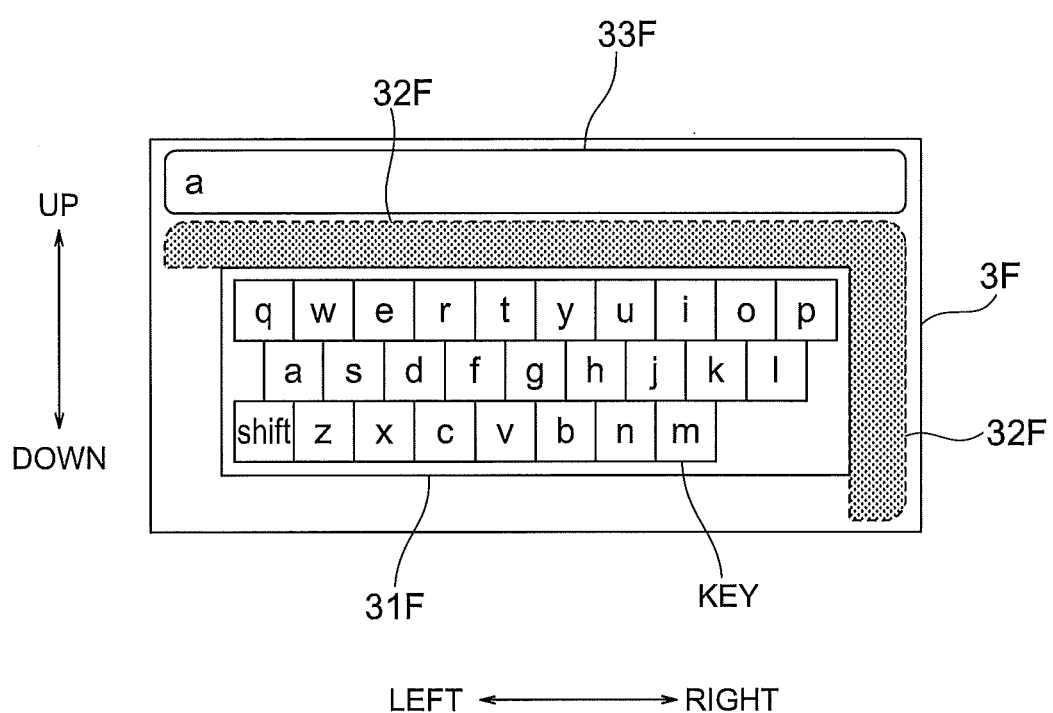
FIG. 12 is a schematic view showing a third modification of the touch panel according to the first embodiment.
Figure 13:
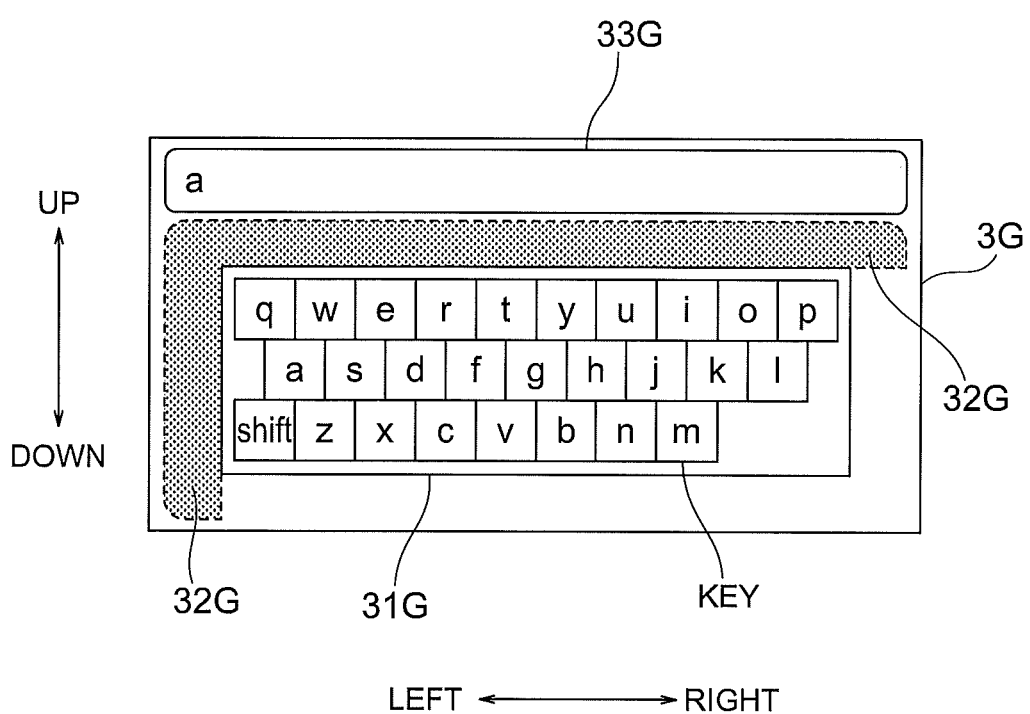
FIG. 13 is a schematic view showing a fourth modification of the touch panel according to the first embodiment.

Further, in a third modification shown in FIG. 12, the non-key display portions 32F of the touch panel 3F are disposed on the upper and right sides of the key display portion 31F. In other words, the non-key display portions 32F are disposed on positions facing upper and right edges of the key display portion 31F. Further, in a fourth modification shown in FIG. 13, the non-key display portions 32G of the touch panel 3G are disposed on the upper and left sides of the key display portion 31G. In other words, the non-key display portions 32G are disposed on positions facing upper and left edges of the key display portion 31G.

In the third and fourth modifications, the non-key display portions 32F (32G) as the second regions are disposed so as to face two edges extending in different directions among the four edges of the key display portion 31F (31G). With such an arrangement, it becomes easy for the user to touch the key display portion 31F (31G) with any finger of the left and right hand, and to touch the non-key display portion 32F (32G) with another finger of the same hand.

In the first embodiment and the modifications thereof, the user touches the non-key display portion 32 while touching the key display portion 31, and therefore it is preferred that distances from respective keys of the key display portion 31 to the non-key display portion 32 are shorter than a distance D between tips of the thumb and the index finger.

Further, in the first embodiment and the modifications thereof, the letter types (i.e., the capital letter and the small letter) of the alphabetical letter are switched by the touch operation on the non-key display portion 32. However, the image processing apparatus 1 can also be configured to perform, for example, a character conversion such as a kana character (i.e., Japanese syllabary character) or a kanji character (i.e., Chinese character).

Further, the image processing apparatus 1 can be configured to perform switching among three options in response to a plurality of touch operations on the non-key display portion 32. For example, in a modification shown in FIG. 14A, when the user once touches the non-key display portion 32 while touching any key (for example, the "q" key) of the key display portion 31, the small letter "q" is switched to the capital letter "Q". When the user touches the non-key display portion 32 once again, the letter "Q" is switched to a hiragana character (for example, "た"). When the user touches the non-key display portion 32 further once again, the hiragana is switched to a katakana character (for example, "タ").

Figures 14A, 14B:
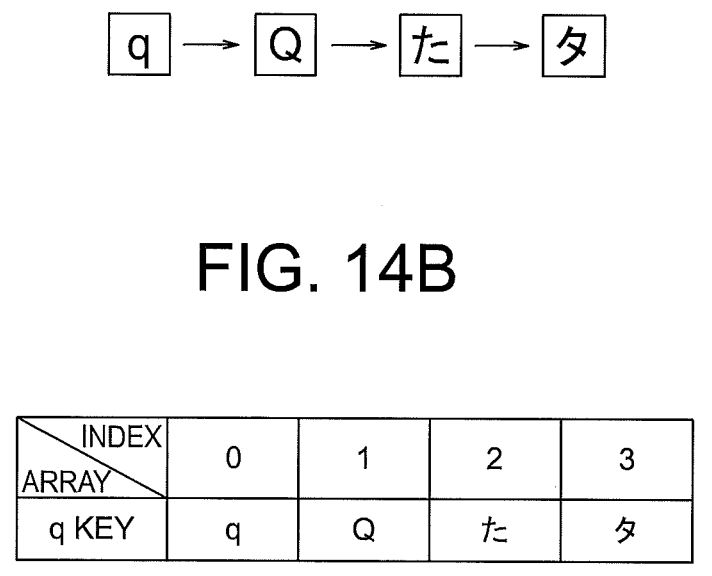

In this modification, four numerals "0", "1", "2" and "3" are used as the state information. The inputtable-letter-type managing unit 6 holds the letters and characters associated with indexes "0", "1", "2" and "3" in each array corresponding to each key (except the shift key). For example, as shown in FIG. 14B, the small letter "q" associated with the index "0", the capital letter "Q" associated with the index "1", the hiragana character "た" associated with the index "2", and the katanaka character "タ" associated with the index "3" are held in the array corresponding to the "q" key.

When the non-key display portion 32 is touched while any key (for example, the "q" key) is continuously touched, the state information held by the letter state storage unit 4 is incremented in the order of 0, 1, 2 and 3. The letter display portion 33 accordingly displays the small letter "q", the capital letter "Q", the hiragana character "た", and the katanaka character "タ".

Second Embodiment

Next, the second embodiment of the present invention will be described. In the above described first embodiment, the touch panel 3 is configured to detect multi-touch input. In contrast, in the second embodiment, the touch panel 3 is not configured to detect multi-touch input. That is, the touch panel 3 of the second embodiment detects a single touch operation on a surface thereof, and outputs position information thereof (i.e., position information of one point).

In this embodiment, the switching of the letter type is performed by touching any key (except the shift key) of the key display portion 31 with a finger, releasing the finger from the key, and then touching the non-key display portion 32. In other words, the switching of the letter type is performed by touching the non-key display portion 32 (i.e., the second region) of the touch panel 3 after touching the key display portion 31. An image processing apparatus of the second embodiment has the same configuration as the image processing apparatus 1 (FIG. 1) of the first embodiment.

Figure 15:
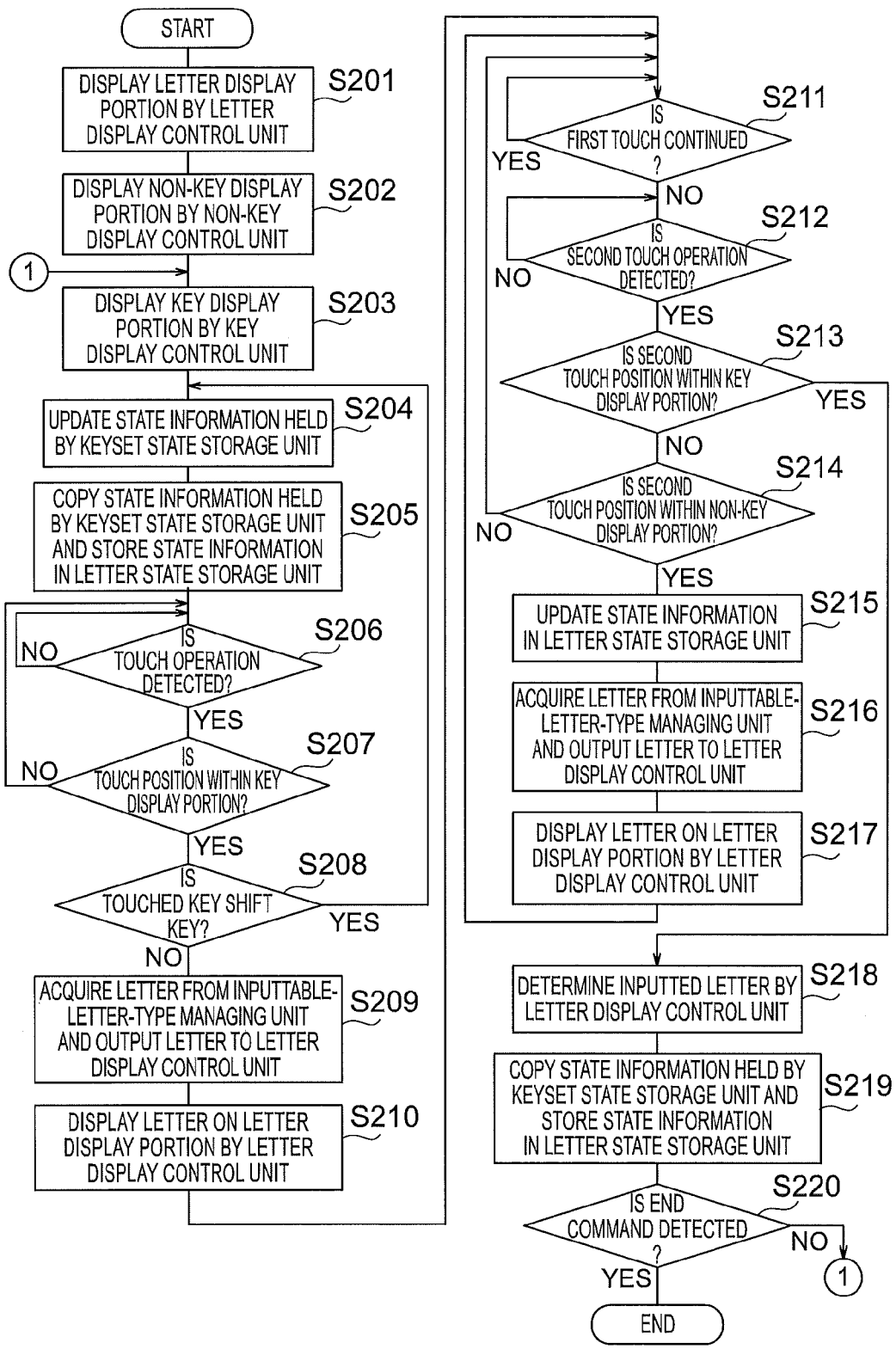
FIG. 15 is a flowchart showing processing of an image processing apparatus according to the second embodiment of the present invention.

FIG. 15 is a flowchart showing processing of the image processing apparatus of the second embodiment. Steps S201 through S210 shown in FIG. 15 are the same as the steps S101 through S110 (FIG. 9) of the first embodiment. In other words, the letter display portion 33 displays the letter in response to the first touch operation on the key display portion 31 in a similar manner as described in the first embodiment.

After the letter display portion 33 displays the letter in response to the first touch operation, the control unit 10 judges whether the input control unit 21 continuously detects the first touch operation (step S211). If the input control unit 21 does not continuously detect the first touch operation (NO in step S211), the control unit 10 judges whether the input control unit 21 detects the second touch operation (step S212).

If the input control unit 21 detects the second touch operation (YES in step S212), the control unit 10 judges whether a position where the touch operation is detected (i.e., a second touch position) is within the key display portion 31 (step S213). If the second touch position is not within the key display portion 31 (NO step S213), the control unit 10 judges whether the second touch position is within the non-key display portion 32 (step S214).

If the second touch position is within the non-key display portion 32 (YES in step S214), the control unit 10 performs the switching of the letter types (steps S215 through S217). The steps S215 through S217 are the same as the steps S114 through S116 (FIG. 9) of the first embodiment.

Further, if the second touch position is within the key display portion 31 (YES in step S213), the letter display control unit 203 determines the inputted letter (step S218).

For example, if the input control unit 21 detects the second touch operation in the key display portion 31 (i.e., either the "m" key or other key) in a state where the letter display portion 33 displays the letter "m", the letter to be displayed is determined to be "m" (which is being displayed on the letter display portion 33).

Then, the control unit 10 copies the state information held by the keyset state storage unit 5, stores the copied state information in the letter state storage unit 4 (step S219), and ends the processing (step S220). The steps S219 and S220 are the same as the steps S118 and S119 (FIG. 9) of the first embodiment.

As described above, according to the second embodiment of the present invention, switching of the letter types of the letter displayed on the letter display portion 33 is performed when the user touches any key of the key display portion 31 with his/her finger, releases the finger from the key, and touches the non-key display portion 32. Therefore, even when the touch panel 3 is not configured to detect multi-touch input, the switching of the letter types can be easily performed.

Third Embodiment

Figure 16:
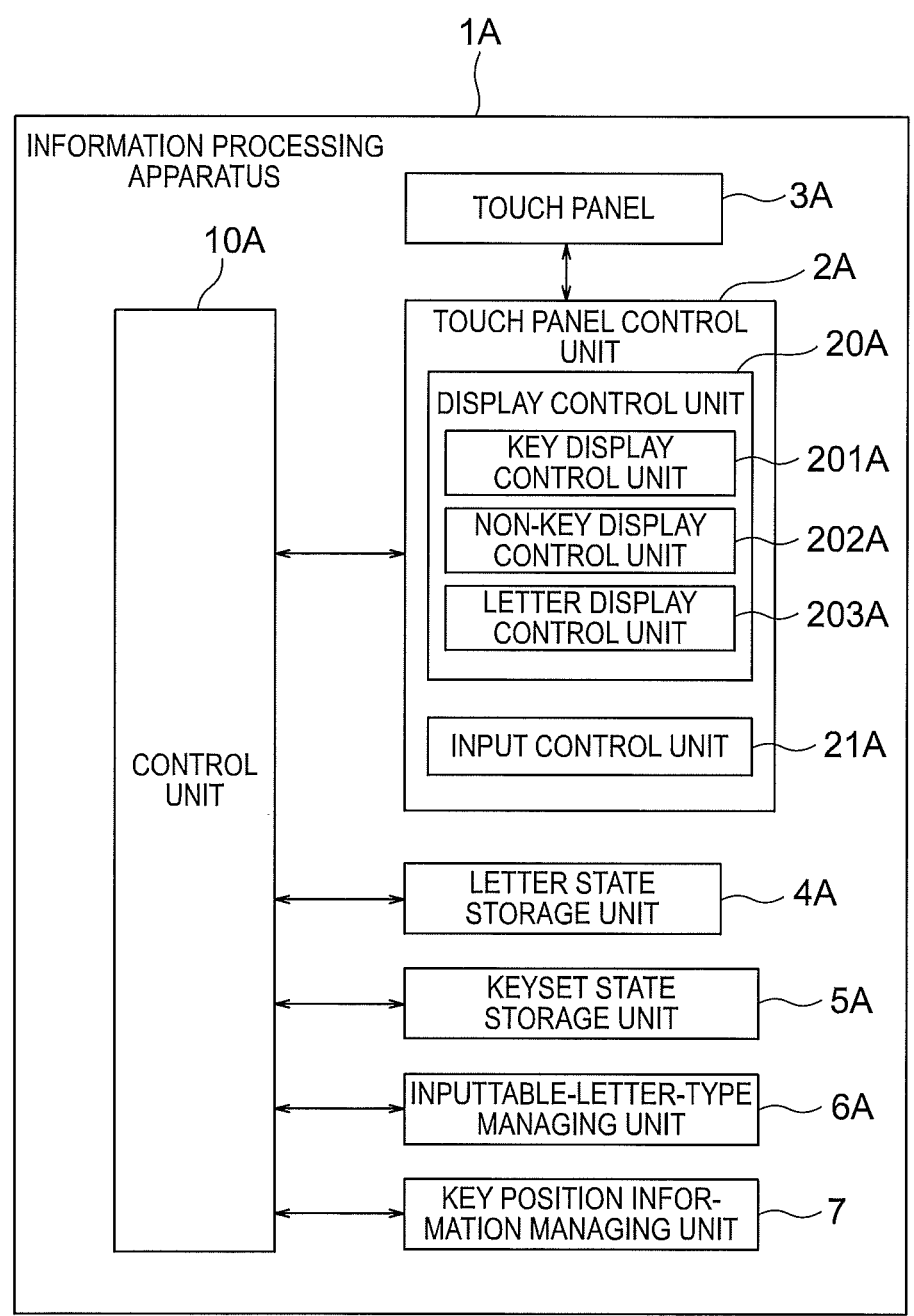
FIG. 16 is a block diagram showing an image processing apparatus according to the third embodiment of the present invention.

Next, the third embodiment of the present invention will be described. FIG. 16 is a block diagram showing a configuration of an image processing apparatus 1A according to the third embodiment.

The image processing apparatus 1A includes a control unit 10A, a touch panel control unit 2A, a touch panel 3A, a letter state storage unit 4A, a keyset state storage unit 5A, an inputtable-letter-type managing unit 6A and a key position information managing unit 7. The key position information managing unit 7 holds information of center coordinates and sizes of the respective keys of the key display portion 31. The size of each key includes a dimension in the vertical direction, and a dimension in the lateral direction.

The touch panel control unit 2A includes a display control unit 20A and an input control unit 21A. The display control unit 20A includes a key display control unit 201A, a non-key display control unit 202A, and a letter display control unit 203A.

Figure 17A:
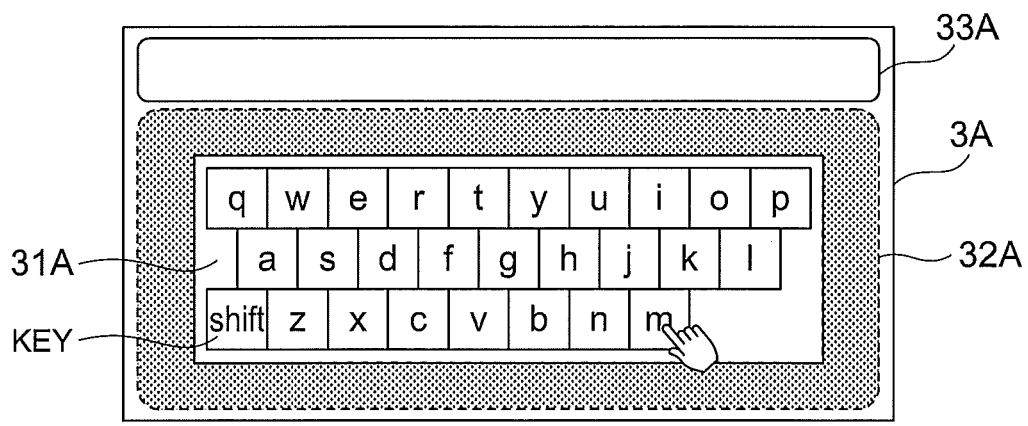
FIGS. 17A, 17B and 17C are schematic views showing an operating method of a touch panel according to the third embodiment.
Figure 17B:
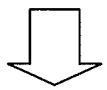
Figure 17B:
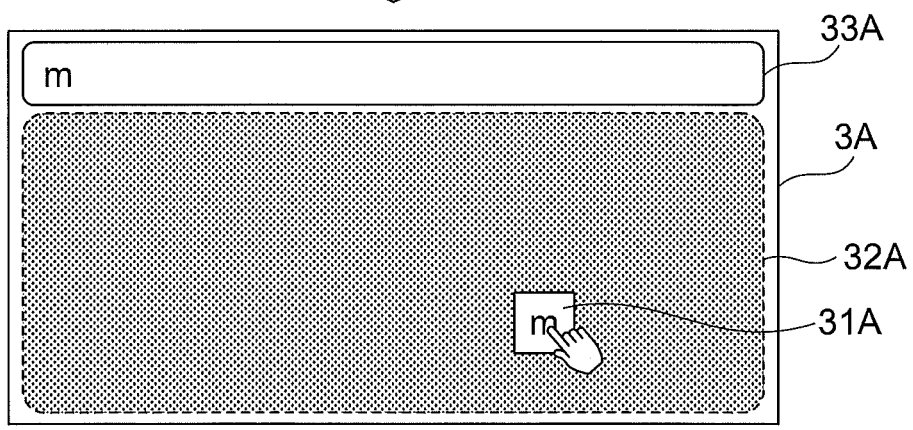
Figure 17C:
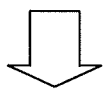
Figure 17C:
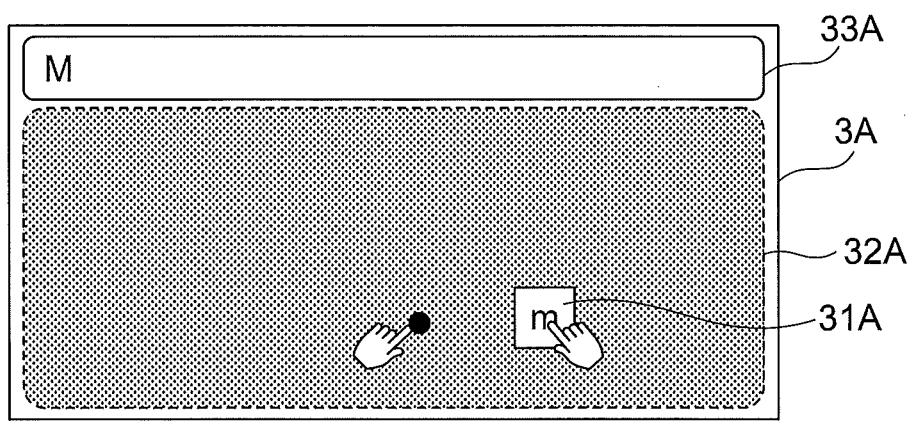

FIGS. 17A, 17B and 17C are schematic views for illustrating an operating method of the touch panel 3A of the third embodiment. Description will be made of a case where a capital or small alphabetical letter is inputted using the touch panel 3A.

As shown in FIG. 17A, the touch panel 3A includes a key display portion 31A in a first region (for example, a center region of the touch panel 3A), and a non-key display portion 32A in a second region outside the first region. The keyset described in the first embodiment is displayed on the key display portion 31A. The touch panel 3A further includes a letter display portion 33A in a region (for example, an upper region of the touch panel 3A) other than regions where the key display portion 31A and the non-key display portion 32A are disposed.

In this embodiment, when any key (except the shift key) of the key display portion 31A is touched, a region of the key display portion 31A other than the touched key is changed to the non-key display portion 32A as shown in FIG. 17B.

That is, when the input control unit 21A detects the touch operation on, for example, the "m" key in a state where the key display control unit 201A displays the key display portion 31A, the non-key display portion 202A changes a portion of the key display portion 31A other than the "m" key into the non-key display portion 32A.

Further, as shown in FIG. 17C, when the input control unit 21A detects the touch operation in the expanded non-key display portion 32A in a state where the touch operation on the "m" key is continuously detected, the letter display control unit 203A causes the letter display portion 33A to display the capital letter "M" in place of the small letter "m".

Other configuration of the image processing apparatus 1A is the same as the image processing apparatus 1 of the first embodiment.

Figure 18:
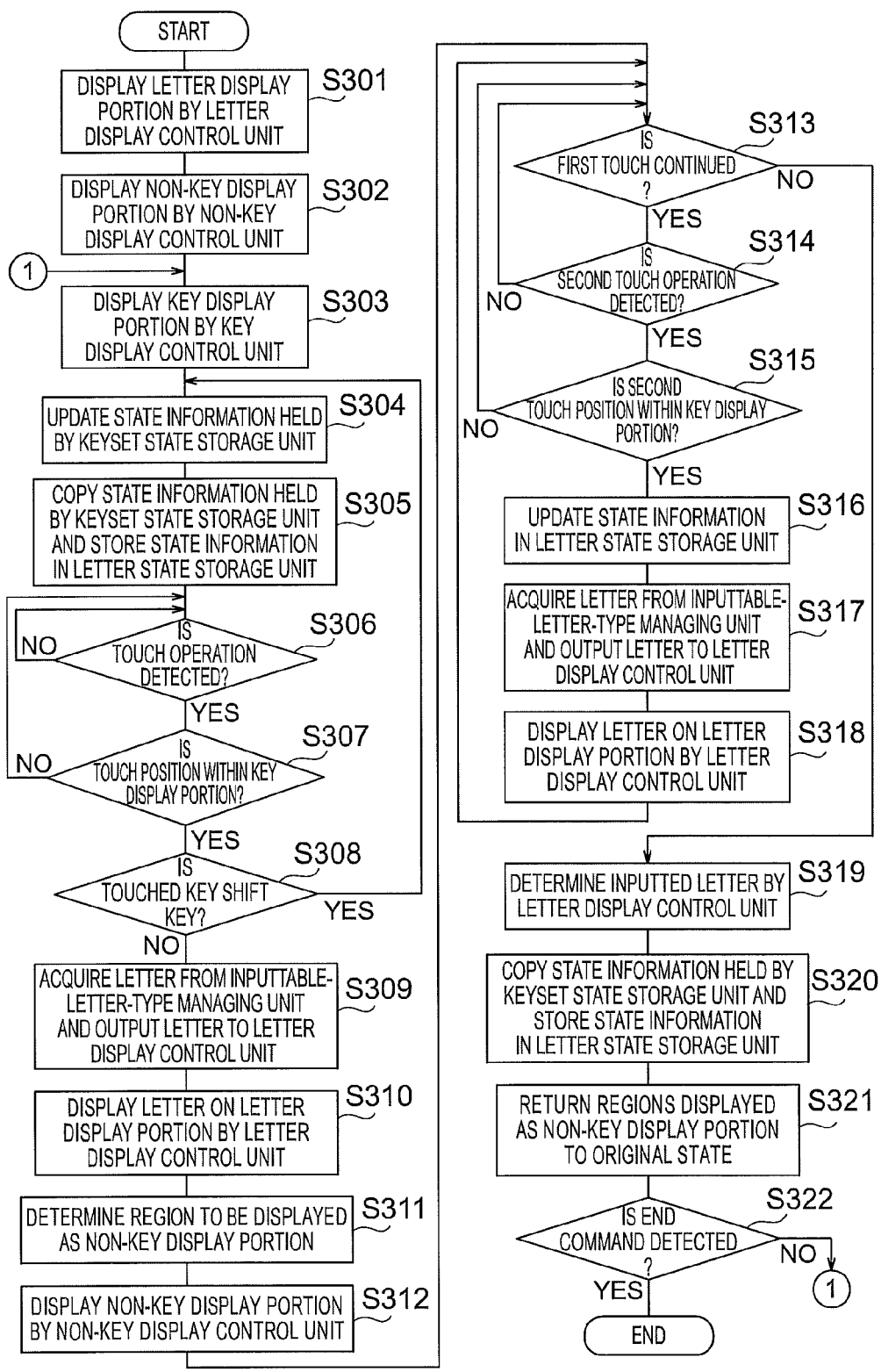
FIG. 18 is a flowchart showing processing of the image processing apparatus according to the third embodiment.

FIG. 18 is a flowchart showing processing of the image processing apparatus 1A according to the third embodiment. Steps S301 through S310 shown in FIG. 18 are the same as the steps S101 through S110 (FIG. 9) of the first embodiment. In other words, the letter display portion 33A displays the letter in response to the first touch operation on the key display portion 31A in a similar manner as described in the first embodiment.

After the letter display portion 33A displays the letter in response to the first touch operation on the key display portion 31A, the control unit 10A determines a region of the key display portion 31A to be changed to the non-key display portion 32A by calculation (step S311). The calculation in the step S311 is described below.

First, the control unit 10A acquires a coordinate of a position (i.e., a first touch position) where the input control unit 21A detects the first touch operation. Then, the control unit 10A compares the acquired coordinate with the center coordinates of the respective keys held by the key position information managing unit 7, and calculates the coordinate of the key closest to the first touch position. The key position information managing unit 7 holds the dimensions of each key in the vertical direction and the lateral direction as described above. Based on the dimensions of the key (corresponding to the calculated coordinate) in the vertical direction and the lateral direction, the control unit 10A calculates coordinates of a top left corner and a bottom right corner of a rectangular region which is to remain displayed as the key display portion 31A. The control unit 10A outputs the information of the rectangular region to the non-key display control unit 202A.

The non-key display control unit 202A displays the non-key display portion 32A based on the information sent from the control unit 10A (step S312). For example, as shown in FIG. 17B, the region of the key display portion 31A except the touched key (i.e., the rectangular region) is changed to the non-key display portion 32A.

Then, the control unit 10A judges whether the input control unit 21A continuously detects the first touch operation (step S313). If the input control unit 21A continuously detects the first touch operation (YES in step S313), the control unit 10A judges whether the input control unit 21A detects the second touch operation (step S314).

If the input control unit 21A detects the second touch operation (YES in step S314), the control unit 10A judges whether a position where the second touch operation is detected (i.e., a second touch position) is within the non-key display portion 32A (step s315). If the second touch position is within the non-key display portion 32A, the control unit 10A performs switching of the letter types (steps S316 through S318). The steps S316 through S318 are the same as the steps S114 through S116 (FIG. 9) of the first embodiment.

If the input control unit 21A does not detect the first touch operation (NO in step S314), the letter display control unit 203A determines the inputted letter (step S319).

Then, the control unit 10A copies the state information held by the key set state storage unit 5A, and stores the copied state information in the letter state storage unit 4A (step S320). Further, the key display control unit 201A returns the region which has been changes to the non-key display portion 32A in the step S312 to the key display portion 31A (step S321).

Then, the control unit 10A ends the processing in a similar manner to the step S119 (FIG. 9) of the first embodiment (step S322).

As described above, according to the third embodiment of the present invention, the region around the first touched key of the key display portion 31A is changed to the non-key display portion 32A. Therefore, an area of the non-key display portion 32A is larger than the non-key display portion 32A of the first embodiment. Further, a distance from the first touched key of the key display portion 31A to the non-key display portion 32A is short. Therefore the non-key display portion 32A can be easily touched, and an input operation error can be suppressed.

Fourth Embodiment

Figure 19:
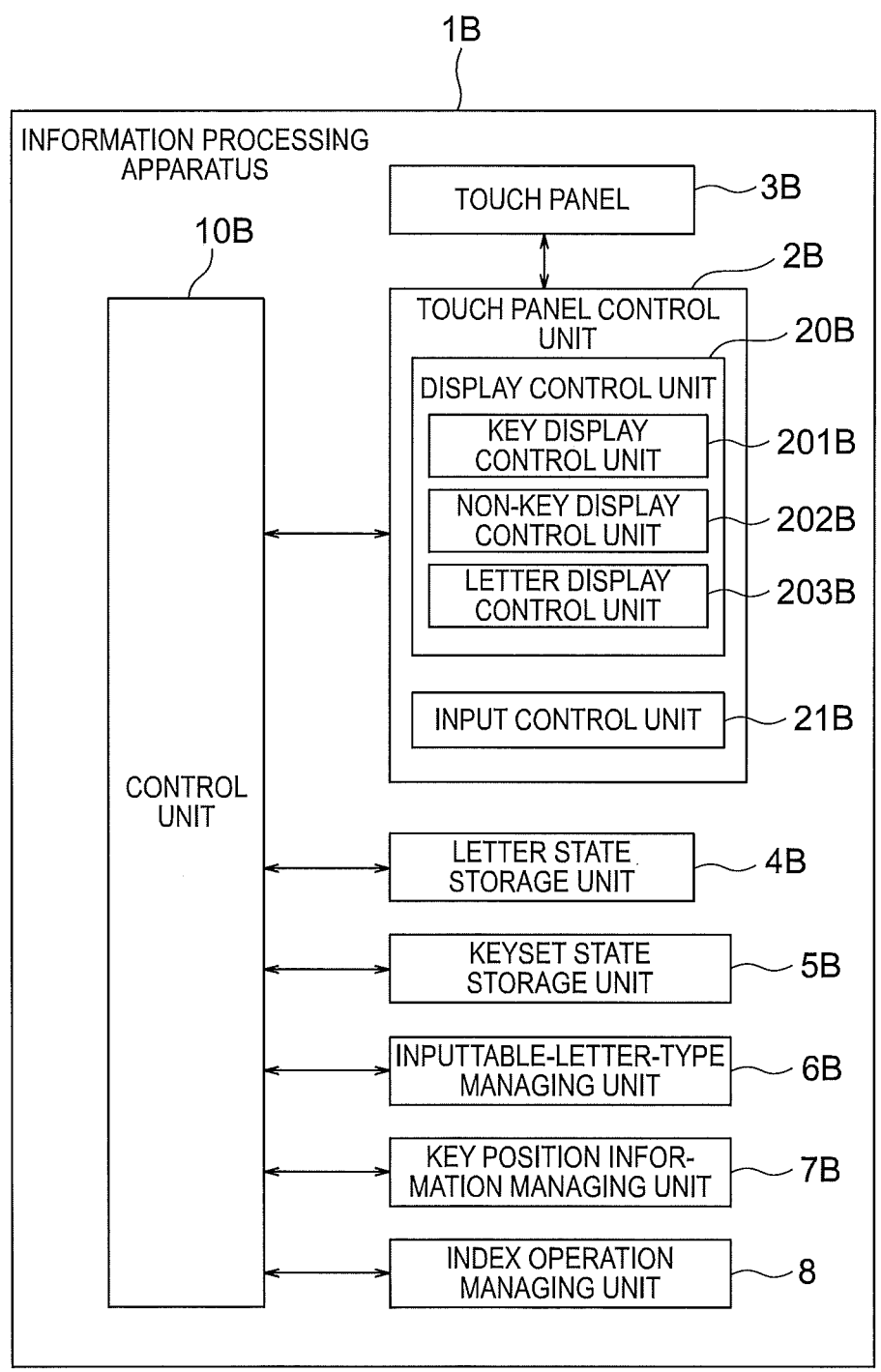
FIG. 19 is a block diagram showing a configuration of an image processing apparatus according to the fourth embodiment of the present invention.

Next, the fourth embodiment of the present invention will be described. FIG. 19 is a block diagram showing a configuration of an image processing apparatus 1B according to the fourth embodiment.

The image processing apparatus 1B includes a control unit 10B, a touch panel control unit 2B, a touch panel 3B, a letter state storage unit 4B, a keyset state storage unit 5B, an inputtable-letter-type managing unit 6B, a key position information managing unit 7B, and an index operation managing unit 8.

The index operation managing unit 8 (i.e., a region managing unit) is configured to manage two regions in the non-key display portion 32B based on a coordinate where the input control unit 21B detects the first touch operation. One of the two regions is provided for incrementing the state information of the letter state storage unit 4B, and the other of the two regions is provided for decrementing the state information of the letter state storage unit 4B.

The touch panel control unit 2B includes a display control unit 20B and an input control unit 21B. The display control unit 20B includes a key display control unit 201B, a non-key display control unit 202B, and a letter display control unit 203B.

Figure 20A:
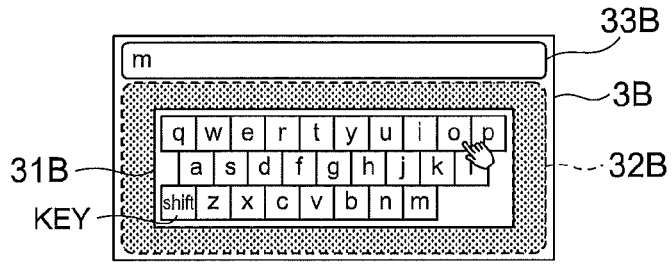
FIGS. 20A through 20D are schematic views showing an operating method of the touch panel according to the fourth embodiment.

FIGS. 20A, 20B, 20C and 20D are schematic views for illustrating an operating method of the touch panel 3B of the fourth embodiment. In the fourth embodiment, an alphabetical keyset is displayed on the key display portion 31B as shown in FIG. 20A. Each key of the keyset is assigned to a plurality of Latin letters as shown in FIG. 21 described later.

Figure 20B:
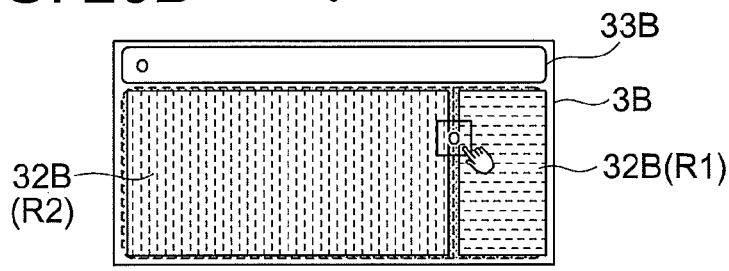
Figure 21:
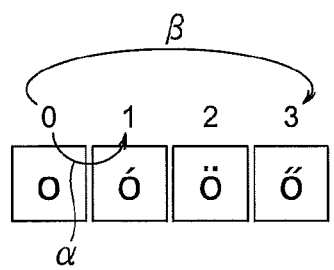
FIG. 21 is a schematic view showing examples of letters corresponding to a key of a key display portion according to the fourth embodiment.

Further, as shown in FIG. 20B, when the first touch operation is detected in the key display portion 31B, the non-key display control unit 202B displays regions R1 and R2 on both sides of a position where the first touch operation is detected (i.e., a first touch position). The regions R1 and R2 are regions in which a second touch operation is to be performed. In other words, the non-key display portion 32B is divided into the regions R1 and R2.

Figure 20C:
Figure 20D:
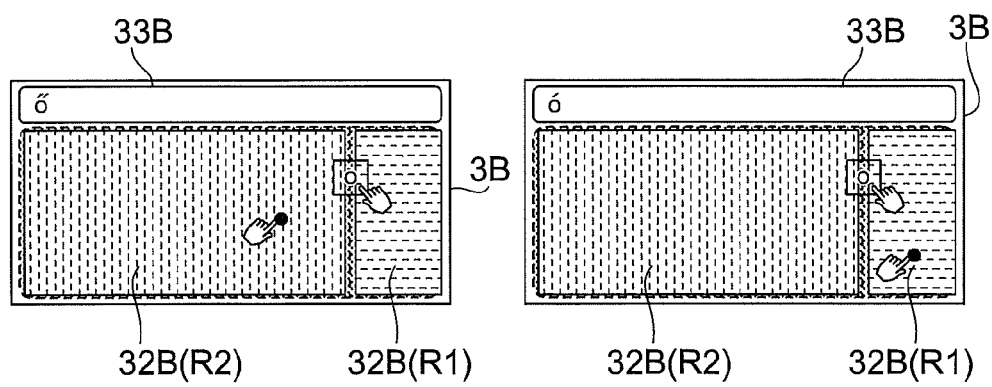

If a position where the second touch operation is detected (i.e., a second touch position) is within the right region R1 as shown in FIG. 20D, the letter display portion 33B displays a subsequent letter (i.e., subsequent to the currently displayed letter) in the array corresponding to the first touched key. In contrast, if the second touch position is within the left region R2 as shown in FIG. 20C, the letter display portion 33B displays a preceding letter in the array corresponding to the first touched key.

In this regard, although the non-key display portion 32B is divided into the right and left regions R1 and R2, this embodiment is not limited to such an arrangement. For example, it is also possible to divide the non-key display portion 32B into upper and lower regions. Further, it is also possible to divide the non-key display portion 32B into upper right, upper left, lower right and lower left regions (i.e., four regions). Further, any switching methods can be assigned to the respective divided regions.

FIG. 21 is a schematic view showing the array of letters corresponding to the "o" key of the key display portion 31B. The inputtable-letter-type managing unit 6B holds arrays corresponding to the respective keys (from "a" to "z") of the keyset, and holds letters associated with indexes "0", "1", "2" and "3" for each array.

For example, the inputtable-letter-type managing unit 6B holds a letter "o", a letter "ó" (i.e., "o" with accent aigu), a letter "ö" (i.e., "o" with umlaut), and a letter "ő" (i.e., "o" with double acute) in the array corresponding to the "o" key. The letter "o" is associated with the index "0". The letter "ó" is associated with the index "1". The letter "ö" is associated with the index "2". The letter "ő" is associated with the index "3".

When the input control unit 21B detects the first touch operation on the "o" key of the key display portion 31B, the letter display control unit 203B causes the letter display portion 33B to display the letter "o" as shown in FIG. 20(B).

When the input control unit 21B detects the second touch operation in the right region R1 in a state where the input control unit 21B detects the first touch operation on the "o" key, the letter display control unit 203B causes the letter display portion 33B to display the letter "ó" in place of the letter "o" as shown in FIG. 20(D).

Further, when the input control unit 21B detects third, fourth and fifth touch operations in the right region R1 in a state where the input control unit 21B detects the first touch operation on the "o" key, the letter display control unit 203B causes the letter display portion 33B to display the letter "ö", the letter "ő", and the letter "o" in this order.

The state information held by the letter state storage unit 4B is incremented every time the touch operation on the right region R1 is detected (as shown by an arrow α in FIG. 21). If the state information reaches a last index in the array held by the inputtable-letter-type managing unit 6B, the state information returns to a first index in the array when the state information is next updated.

When the input control unit 21B detects the second touch operation in the left region R2 in a state where the input control unit 21B detects the first touch operation on the "o" key, the letter display control unit 203B causes the letter display portion 33B to display the letter "ő" in place of the "o" as shown in FIG. 20(C).

Further, when the input control unit 21B detects third, fourth and fifth touch operations in the left region R2 in a state where the input control unit 21B detects the first touch operation on the "o" key, the letter display control unit 203B causes the letter display portion 33B to display the letter "ö", the letter "ó", and the letter "o" in this order.

The state information held by the letter state storage unit 4B is decremented every time the touch operation on the left region R2 is detected. When the state information reaches the first index in the array held by the inputtable-letter-type managing unit 6B, the state information returns to the last index in the array when the state information is next updated (as shown by an arrow β in FIG. 21).

The switching of the letter can be performed until the input control unit 21 does not detect the first touch operation on the "o" key. When the input control unit 21 does not detect the touch operation on the "o" key (i.e., when the input control unit 21 detects no touch operation on the touch panel 3B), the input letter is determined.

Other configuration of the image processing apparatus 1B is the same as the image processing apparatus 1 of the first embodiment.

Figure 22:
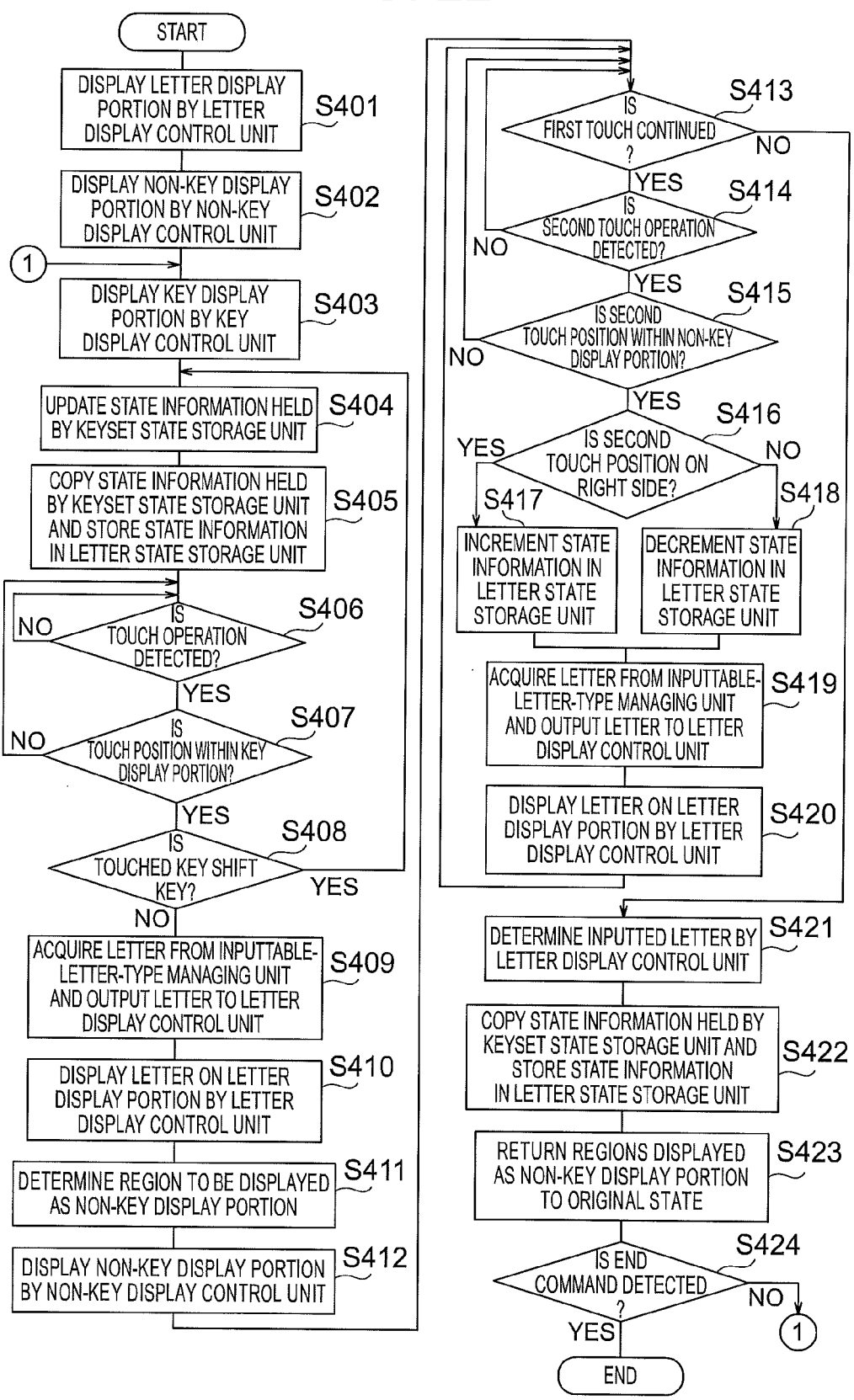
FIG. 22 is a flowchart showing processing of the image processing apparatus according to the fourth embodiment.

FIG. 22 is a flowchart showing processing of the image processing apparatus 1B of the fourth embodiment. Steps S401 through S410 shown in FIG. 22 are the same as the steps S101 through S110 (FIG. 9) of the first embodiment. In other words, the letter display portion 33B displays the letter in response to the first touch operation on the key display portion 31B in a similar manner as described in the first embodiment.

After the letter display portion 33B displays the letter in response to the first touch operation on the key display portion 31B, the control unit 10B determines regions of the key display portion 31B to be changed to the non-key display portion 32B by calculation (step S411) as described in the third embodiment. For example, the control unit 10B determines the regions R1 and R2 (i.e., the non-key display portion 32B) on the left and right sides of the first touch position. The control unit 10B outputs the information of the regions R1 and R2 (which are to be changed to the non-key display portion 32B) to the non-key display control unit 202B.

The non-key display control unit 202B displays the non-key display portion 32B based on the information sent from the control unit 10B (step S412). For example, as shown in FIG. 20B, the regions of the key display portion 31B except the touched key is changed to the regions R1 and R2 of the non-key display portion 32B.

Then, the control unit 10B judges whether the input control unit 21B continuously detects the first touch operation (step S413). If the input control unit 21B continuously detects the first touch operation (YES in step S413), the control unit 10B judges whether the input control unit 21B detects the second touch operation (step S414).

If the input control unit 21B detects the second touch operation (YES in step S414), the control unit 10B judges whether the second touch position is within the non-key display portion 32B (step S415).

If the second touch position is within the non-key display portion 32B (YES in step S415), the control unit 10B judges whether the second touch position is within the right region R1 with respect to the first touch position (step S416).

If the second touch position is within the right region R1 with respect to the first touch position (YES in step S416), the control unit 10B updates the state information of the letter state storage unit 4B by incrementing (step S417).

In contrast, if the second touch position is within the left region R2 with respect to the first touch position (NO in step S416), the control unit 10B updates the state information of the letter state storage unit 4B by decrementing (step S418).

Next to either the step S417 or S418, the control unit 10B accesses the array (corresponding to the touched key) held by the inputtable-letter-type managing unit 6B using the state information of the letter state storage unit 4B as the index, and acquires the letter associated with the index. The control unit 10B sends the acquired letter to the letter display control unit 203B (step S419). The letter display control unit 203B causes the letter display portion 33B to display the letter sent from the control unit 10B in place of the previously displayed letter (step S420).

For example, when the right region R1 of the non-key display portion 32B is touched as shown in FIG. 20D in a state where the letter display portion 33B displays the letter "o", the control unit 10B updates the state information "0" of the letter state storage unit 4B to "1" by incrementing. The control unit 10B accesses the array corresponding to the "o" key held by the inputtable-letter-type managing unit 6B using the updated state information "1" as the index, and acquires the letter "ó" associated with the index "1". Then, the control unit 10B sends the acquired letter "ó" to the letter display control unit 203B. The letter display control unit 203B causes the letter display portion 33B to display the letter "ó".

Further, when the left region R2 of the non-key display portion 32B is touched as shown in FIG. 20C in a state where the letter display portion 33B displays the letter "o", the control unit 10B updates the state information "0" of the letter state storage unit 4B to "3" by decrementing. The control unit 10B accesses the array corresponding to the "o" key held by the inputtable-letter-type managing unit 6B using the updated state information "3" as the index, and acquires the letter "ŏ″" associated with the index "3". Then, the control unit 10B sends the acquired letter "ŏ″" to the letter display control unit 203B. The letter display control unit 203B causes the letter display portion 33B to display the letter "ŏ″".

If the input control unit 21B does not detect the first touch operation (NO in step S413), the letter display control unit 203B determines the inputted letter (step S421).

Then, the control unit 10B copies the state information held by the key set state storage unit 5B, and stores the copied state information in the letter state storage unit 4B (step S422). Further, the key display control unit 201B returns the regions which have been changes to the regions R1 and R2 (i.e., the non-key display portion 32B) in the step S412 to the key display portion 31B (step S423).

Then, the control unit 10B ends the processing in a similar manner to the step S119 (FIG. 9) of the first embodiment (step S424).

As described above, according to the fourth embodiment of the present invention, the regions R1 and R2 of the non-key display portion 32B are disposed around the first touched key of the key display portion 31A. Further, different letters are displayed depending on which of the regions R1 and R2 is touched. Therefore, even when a plurality of letters are assigned to each key, the user can easily select a letter to be displayed.

Further, a total area of the regions R1 and R2 the non-key display portion 32B is large, and a distance from the first touched key to either of the regions R1 and R2 is short. Therefore, the non-key display portion 32B can be easily touched, and an input operation error can be suppressed.

Fifth Embodiment

Next, the fifth embodiment of the present invention will be described.

The first to fourth embodiments are applied to the switching (or conversion) of letters. However, the present invention can be applied to other applications. In the fifth embodiment of the present invention, the above described first embodiment is applied to setting or changing operating conditions of an image forming apparatus 1C as an image processing apparatus.

Figure 23:
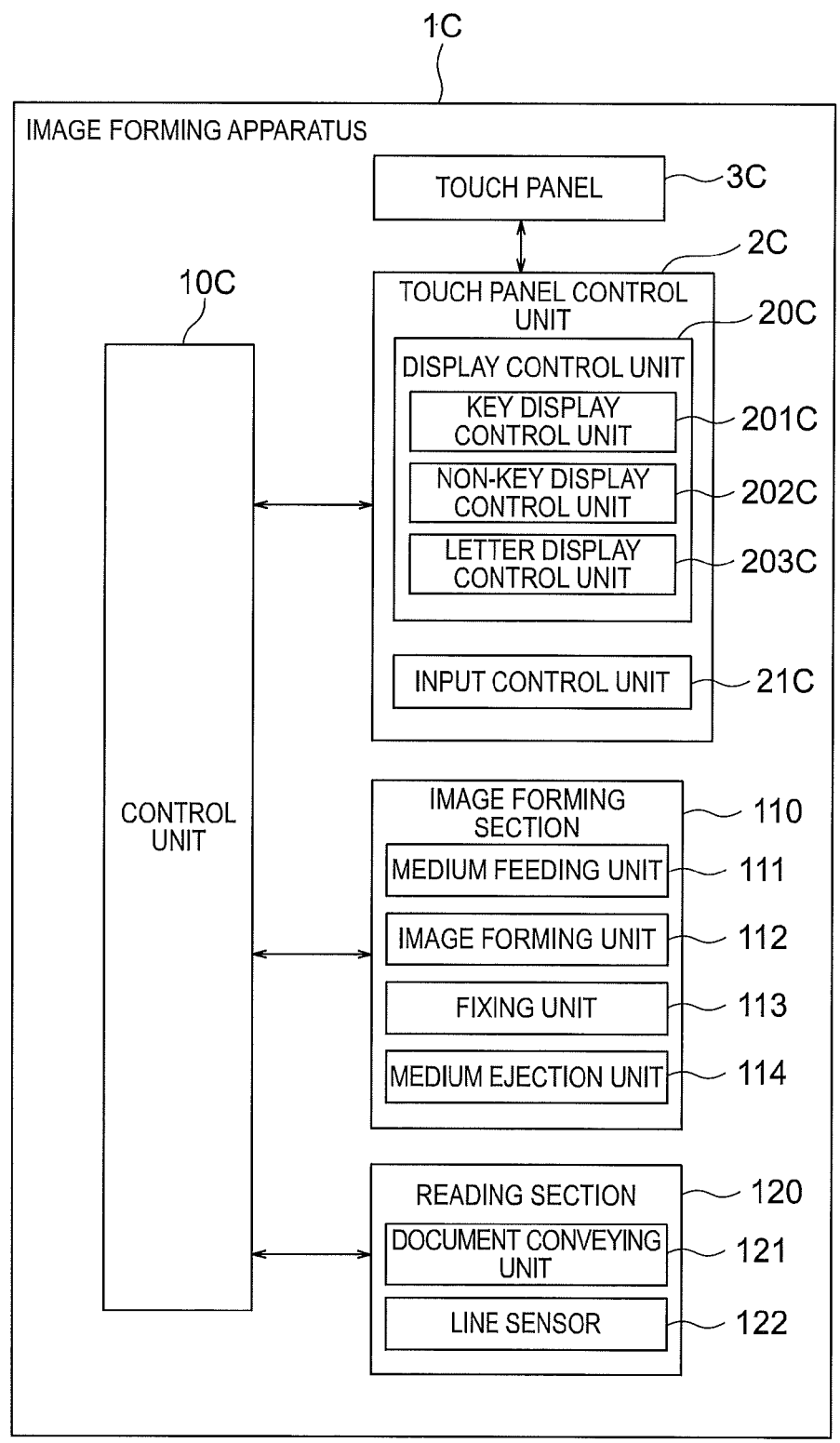
FIG. 23 is a block diagram showing a configuration of an image forming apparatus according to the fifth embodiment of the present invention.

FIG. 23 is a block diagram showing a configuration of the image forming apparatus 1C according to the fifth embodiment. The image forming apparatus 1C includes a control unit 10C, a touch panel control unit 2C, a touch panel 3C, an image forming section 110 (i.e., a printer section), and a reading section 120 (i.e., a scanner section). The image forming apparatus 1C causes the reading section 120 to read an image of a document (i.e., a manuscript) and causes the image forming section 110 to print the image on a medium.

The image forming section 110 includes a medium feeding unit 111, an image forming unit 112, a fixing unit 113 and a medium ejection unit 114. The medium feeding unit 111 is configured to feed a medium (for example, a printing sheet) from a medium tray or the like. The image forming unit 112 is configured to form a toner image (i.e., a developer image) on the medium fed by the medium feeding unit 111. The fixing unit 113 is configured to fix the toner image (having been transferred by the image forming unit 112) to the medium. The medium ejection unit 114 is configured to eject the medium to which the toner image is fixed.

The reading section 120 includes a document conveying unit 121 and a line sensor 122. The document conveying unit 121 is configured to convey a document (i.e., a reading object). The line sensor 122 (i.e., a reading sensor) is configured to read the document. The line sensor 122 reads line images of the document in a main-scanning direction while the document conveying unit 121 conveys the document in a sub-scanning direction.

The touch panel 2C includes a display control unit 20C and an input control unit 21C. The display control unit 20C includes a key display control unit 201C, a non-key display control unit 202C and a letter display control unit 203C.

Figure 24:
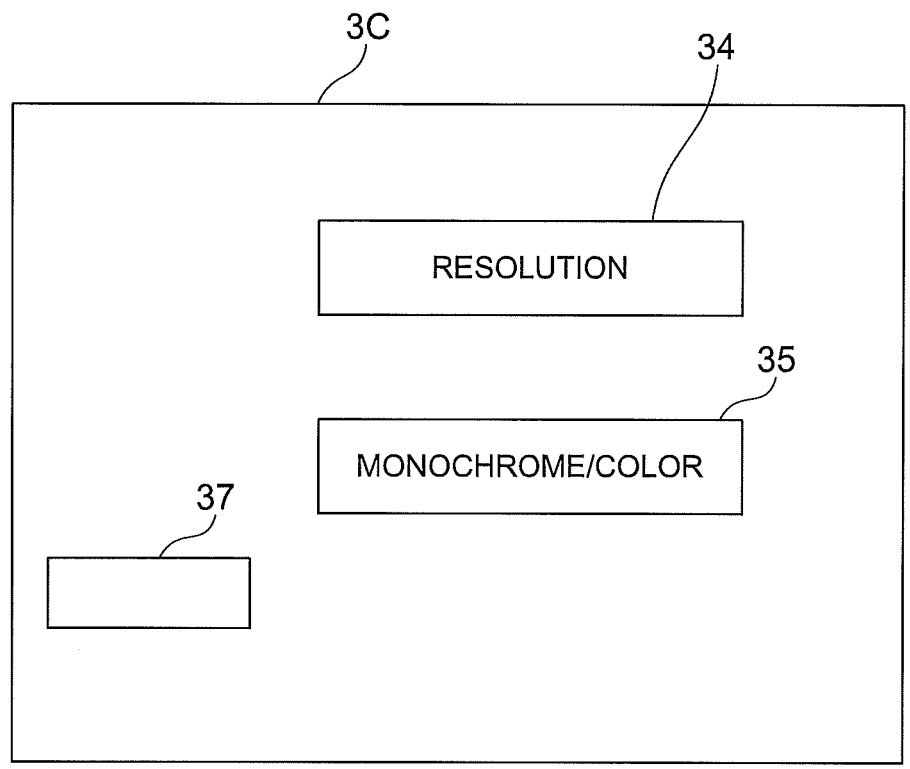
FIG. 24 is a schematic view showing an example of a display on a touch panel according to the fifth embodiment.

FIG. 24 shows an example of a display on the touch panel 3C. The key display control unit 201C displays a key display portion 34 (i.e., a first display portion) in a predetermined region of the touch panel 3C. The key display portion 34 is provided for setting a reading resolution of the reading section 120. The key display portion 34 constitutes a single input key, and is provided with an indication "RESOLUTION".

Further, the key display control unit 201C also displays a key display portion 35 (i.e., a first display portion) in a region (for example, a region below the key display portion 34) of the touch panel 3C other than the region where the key display portion 34 is disposed. The key display portion 35 is provided for selecting either a monochrome mode or a color mode of image formation and image reading. The key display portion 35 constitutes a single input key, and is provided with an indication "MONOCHROME/COLOR".

Further, the key display control unit 201C displays a setting portion 37 (i.e., a second display portion) in a region (for example, a region obliquely below the key display portions 34 and 35) of the touch panel 3C other than the regions where the key display portions 34 and 35 are disposed. The setting portion 37 is provided for setting operating conditions of the image forming section 110 and the reading section 120.

Figure 25:
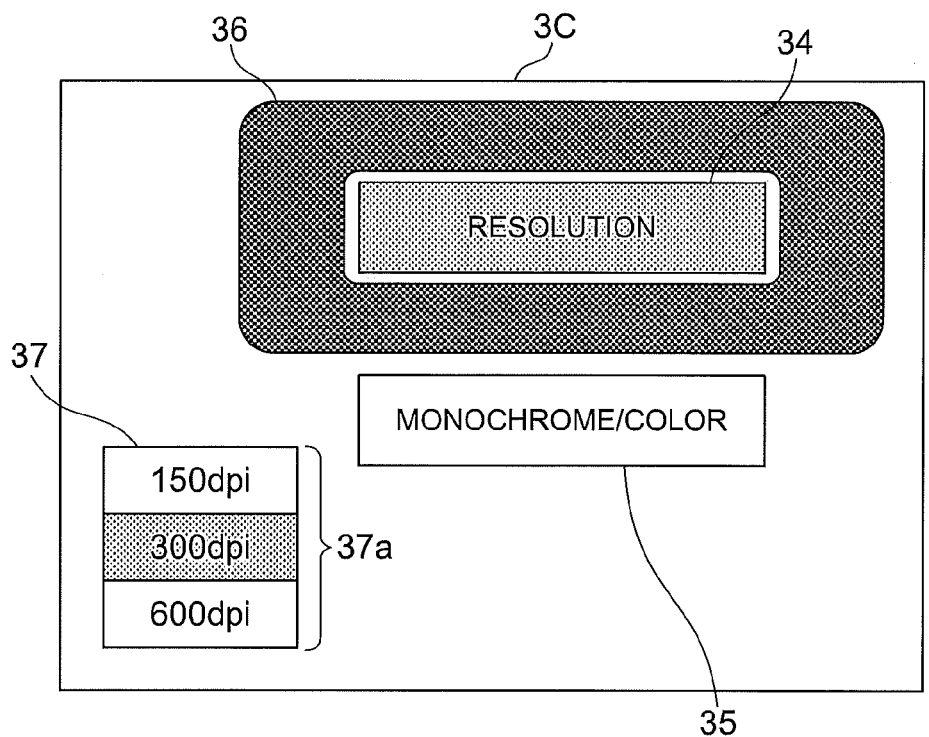
FIG. 25 is a schematic view showing an example of a display on the touch panel according to the fifth embodiment when a key display portion thereof is touched.

FIG. 25 is a schematic view showing an example of a display on the touch panel 3C when the key display portion 34 is touched. When the input control unit 21C detects a first touch operation on the key display portion 34, the non-key display control unit 202C displays a non-key display portion 36 (i.e., a second region) outside the key display portion 34. Although the non-key display portion 36 is displayed so as to surround the key display portion 34 in FIG. 25, the non-key display portion 36 can be displayed as the non-key display portions 32D, 32E, 32F and 32G (FIGS. 10 through 13) of the modifications of the first embodiment.

Further, when the input control unit 21C detects a second touch operation on the non-key display portion 36, the key display control unit 201C displays a list 37a on the setting portion 37 (i.e., the second display portion) for setting the reading resolution of the reading section 120.

The list 37a includes a plurality of choices of the resolution (for example, 150 dpi, 300 dpi and 600 dpi). When the input control unit 21C detects a third touch operation on any of the choices (i.e., resolutions) contained in the list 37a, the control unit 100 sets the reading resolution of the reading section 120 to the resolution selected at the list 37a.

Figure 26:
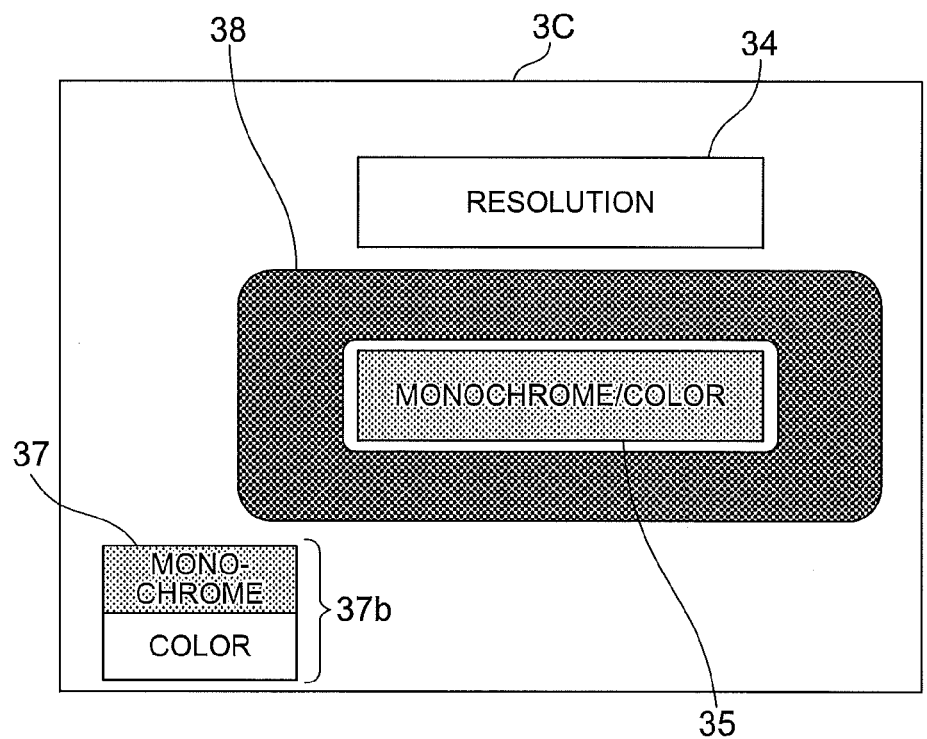
FIG. 26 is a schematic view showing an example of a display on the touch panel according to the fifth embodiment when another key display portion thereof is touched.

FIG. 26 is a schematic view showing an example of a display on the touch panel 3C when the key display portion 35 is touched. When the input control unit 21C detects the first touch operation on the key display portion 35, the non-key display control unit 202C displays a non-key display portion 38 (i.e., a second region) outside the key display portion 35. Although the non-key display portion 38 is displayed so as to surround the key display portion 35 in FIG. 26, the non-key display portion 38 can be displayed as the non-key display portions 32D, 32E, 32F and 32G (FIGS. 10 through 13) of the modifications of the first embodiment.

Further, when the input control unit 21C detects the second touch operation on the non-key display portion 38, the key display control unit 201C displays a list 37b on the setting portion 37 (i.e., the second display portion) for selecting either the monochrome mode or the color mode.

When the input control unit 21C detects a third touch operation on either of the choices (i.e., the monochrome mode or the color mode) contained in the list 37b, the control unit 10C sets an operation mode of the image forming section 110 and the reading section 120 to the operation mode selected at the list 37b.

As described above, according to the fifth embodiment of the present invention, when the user sets the operation conditions using the touch panel 3C, the list 37a for setting the reading resolution is displayed by touching the key display portion 34 and then touching the non-key display portion 36 disposed outside the key display portion 34. Further, the list 37b for selecting either the monochrome mode or the color mode is displayed by touching the key display portion 35 and then touching the non-key display portion 38 disposed outside the key display portion 35. Therefore, a plurality of operating conditions of the image forming apparatus 1C can be set with a relatively small number of operations.

Further, since the non-key display portion 36 (38) is disposed so as to surround the key display portion 34 (35), the user can easily touch the non-key display portion 36 (38).

In this regard, the fifth embodiment is also applicable to the second embodiment using the touch panel which is not configured to detect multi-touch input. In such a case, the non-key display portion 36 (38) is displayed around the key display portion 34 (35) by touching the key display portion 34 (35) with a finger and then releases the finger from the key display portion 34 (35).

Further, the second region where the non-key display portion 36 (38) is disposed can be provided with an indication (for example, "CHANGE RESOLUSION") of a function of the non-key display portion 36 (38) so that the user can easily recognize the function of the non-key display portion 36 (38).

Sixth Embodiment

Next, the sixth embodiment of the present invention will be described. In the above described embodiments, the non-key display portion 32 is assigned with a function to select (convert) a letter or the like. However, the present invention is not limited to such a configuration. In the sixth embodiment, the function of the non-key display portion 32 can be switchable.

Figure 27:
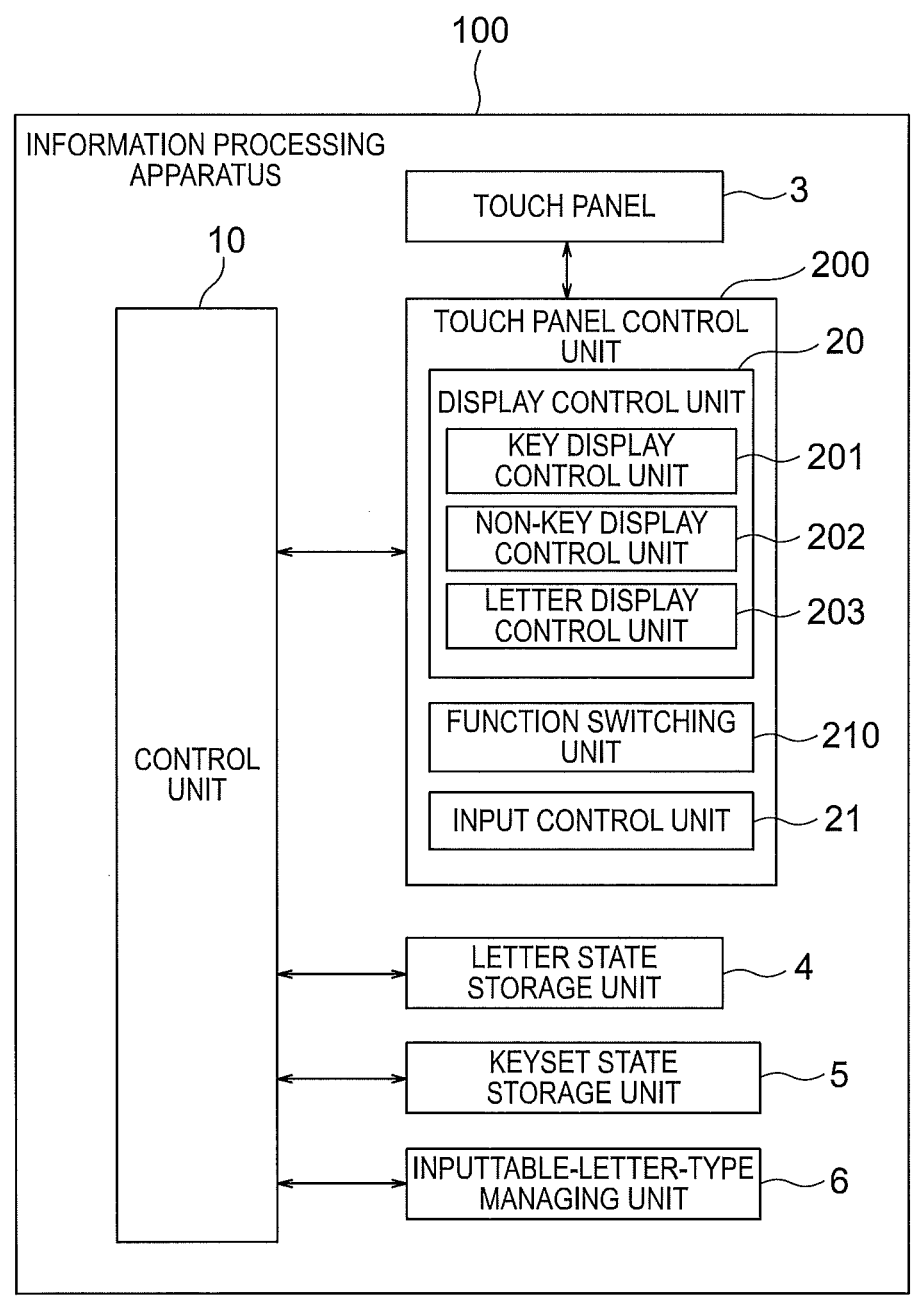
FIG. 27 is a block diagram showing a configuration of an image processing apparatus according to the sixth embodiment of the present invention.

FIG. 27 is a block diagram showing a configuration of an image processing apparatus 100 according to the sixth embodiment. The image processing apparatus 100 is different from the image processing apparatus 1 of the first embodiment in that a touch panel control unit 200 includes a function switching unit 210 for switching the function of the non-key display portion 32.

Figure 28:
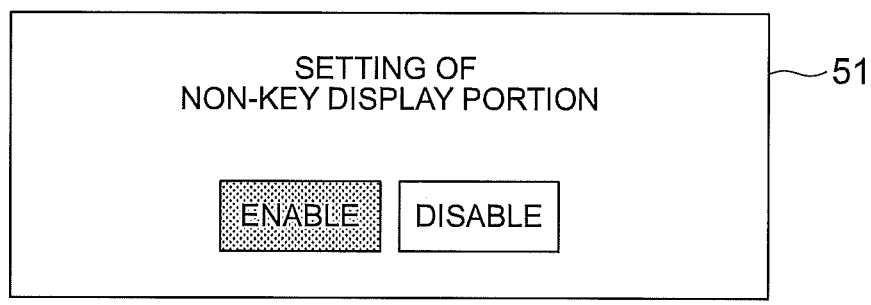
FIG. 28 is a schematic view showing an example of a setting screen displayed by a function switching unit according to the sixth embodiment.
Figure 29:
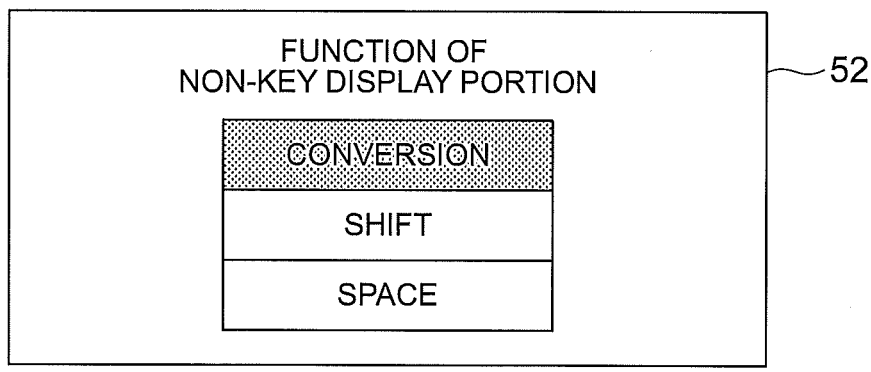
FIG. 29 is a schematic view showing an example of a function setting screen portion displayed by the function switching unit according to the sixth embodiment.

FIGS. 28 and 29 are schematic views showing examples of displays on the touch panel 3.

As shown in FIG. 28, the function switching unit 210 of the touch panel control unit 200 displays a setting screen 51 (i.e., a setting portion) on the touch panel 3 for switching between enabling and disabling the function of the non-key display portion 32 (FIG. 2). The user can enable or disable the function of the non-key display portion 32 by touching the setting screen 51. In a state where the user disables the function of the non-key display portion 32, the display on the touch panel 3 does not change even when the user touches the non-key display portion 32.

Further, as shown in FIG. 29, it is also possible that the function switching unit 210 displays a function setting screen 52 (i.e., a function setting portion) on the touch panel 3 for selecting among a plurality of functions of the non-key display portion 32. In an example shown in FIG. 29, the function setting screen 52 contains "conversion", "shift" and "space" as selectable functions of the non-key display portion 32.

If the "conversion" is selected at the function switching screen 52, the non-key display portion 32 functions as the non-key display portion 32 described in the first embodiment. If the "shift" is selected at the function switching screen 52, the non-key display portion 32 functions as the shift key described in the first embodiment. If the "space" is selected at the function switching screen 52, the non-key display portion 32 functions as a general space key.

In this regard, the setting screen 51 (FIG. 28) and the function setting screen 52 (FIG. 29) can be displayed in arbitrary positions on the touch panel 3. Other configuration of the image processing apparatus 100 is the same as the image processing apparatus 1 of the first embodiment.

As described above, according to the sixth embodiment of the present invention, the function of the non-key display portion 32 is switchable, and therefore operability and usability of the image processing apparatus 100 can be enhanced.

Seventh Embodiment

Next, the seventh embodiment of the present invention will be described. In the above described embodiments, the first region (i.e., the region where the key display portion 31 is disposed) and the second region (i.e., the non-key display portion 32) are both provided on the touch panel 3. However, the present invention is not limited to such a configuration. In the seventh embodiment of the present invention, a first region is provided on a touch panel 3H, and a second region is provided on a casing portion 40 outside the touch panel 3H.

Figure 30:
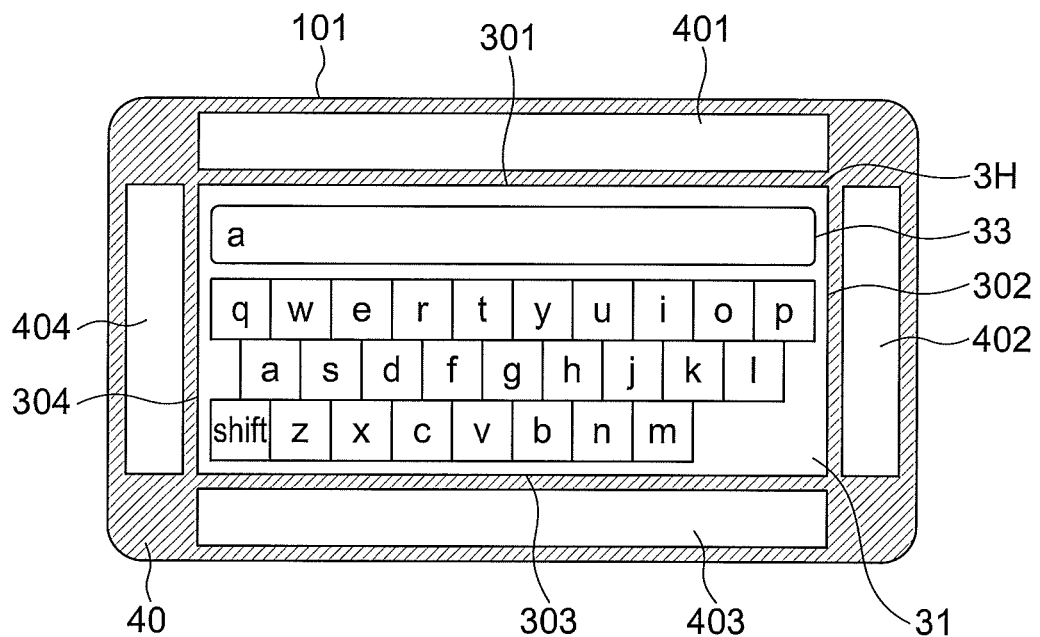
FIG. 30 is a view showing a configuration of an image processing apparatus according to the seventh embodiment of the present invention.

FIG. 30 shows a configuration of an image processing apparatus 101 according to the seventh embodiment. The image processing apparatus 101 is, for example, a mobile terminal such as a smart phone. The image processing apparatus 101 includes the touch panel 3H, and the casing portion 40 provided outside the touch panel 3H.

The touch panel 3H has an upper edge 301, a right edge 302, a lower edge 303 and a left edge 304. These four edges 301, 302, 303 and 304 constitute a periphery of the touch panel 3H. The casing portion 40 is made of plastic or the like, and has a shape so as to surround the four edges 301, 302, 303 and 304 of the touch panel 3H.

The key display portion 31 (i.e., the first display portion) and the letter display portion 33 (i.e., the second display portion) are displayed on the touch panel 3H. In this regard, this embodiment is not limited to such a configuration. For example, the letter display portion 33 can be provided on the casing portion 40. In such a case, an entire region of the touch panel 3H constitutes the first region.

The casing portion 40 has operation reception portions 401, 402, 403 and 404 (i.e., a second region). The operation reception portion 401, 402, 403 and 404 are disposed so as to respectively faces four edges 301, 302, 303 and 304 of the touch panel 3H.

Functions of the operation reception portion 401, 402, 403 and 404 are not limited. For example, the operation reception portion 401, 402, 403 and 404 can have the same function as the non-key display portion 32 described in the first embodiment. Alternatively, the operation reception portion 401, 402, 403 and 404 can have different functions. For example, it is possible that the operation reception portion 401 and 403 have the same function as the non-key display portion 32, the operation reception portion 402 has the function of the shift key, and the operation reception portion 402 has the function of the space key.

Other configuration of the image processing apparatus 101 is the same as the image processing apparatus 1 of the sixth embodiment.

In FIG. 30, the operation reception portions 401, 402, 403 and 404 respectively faces four edges 301, 302, 303 and 304 of the touch panel 3H (i.e., the first region). However, this embodiment is not limited to such a configuration. High operability can be achieved as long as the operation reception portions are disposed on positions facing at least two edges (for example, two parallel edges, two edges extending in different directions, or three edges) among the four edges of the touch panel 3H.

Figure 31:
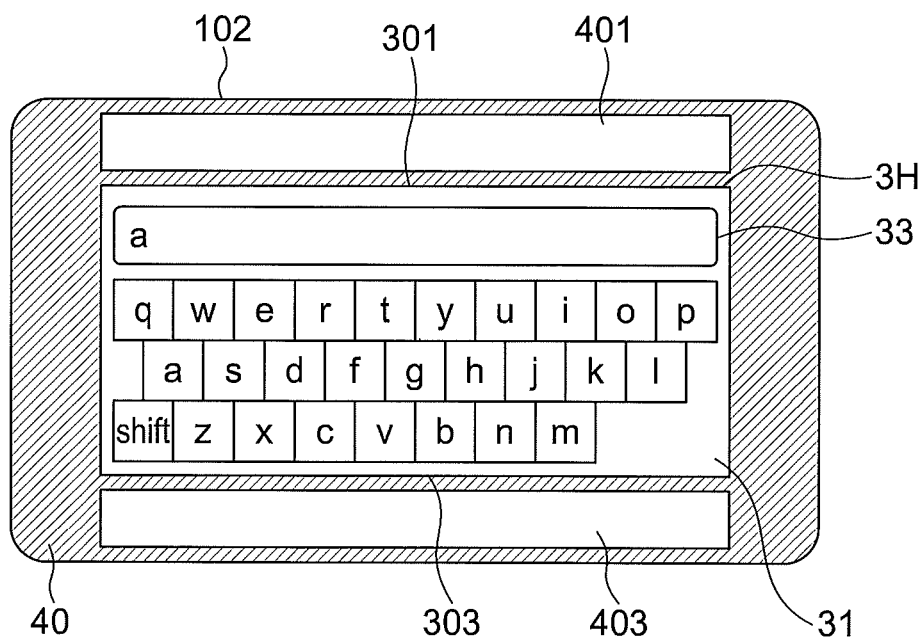
FIG. 31 is a view showing a first modification of the image processing apparatus according to the seventh embodiment.
Figure 32:
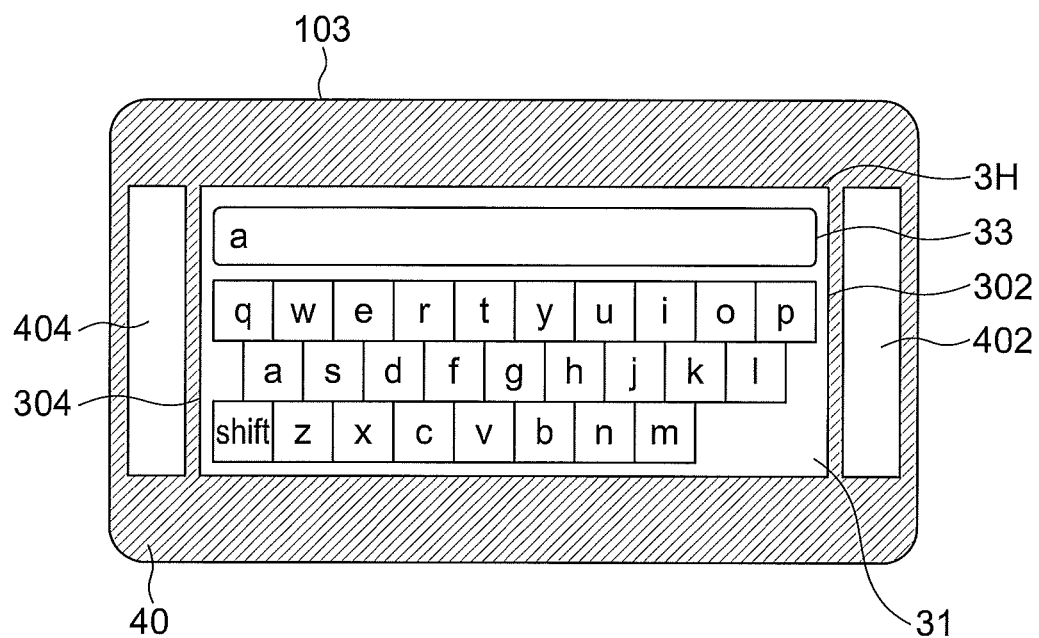
FIG. 32 is a view showing a second modification of the image processing apparatus according to the seventh embodiment.

For example, in an image processing apparatus 102 of a first modification shown in FIG. 31, the operation reception portions 401 and 403 are disposed on upper and lower sides of the touch panel 3H. In other words, the operation reception portions 401 and 403 are disposed on positions facing the upper and lower edges 301 and 303 of the touch panel 3H. Further, in an image processing apparatus 103 of a second modification shown in FIG. 32, the operation reception portions 402 and 404 are disposed on right and left sides of the touch panel 3H. In other words, the operation reception portions 402 and 404 are disposed on positions facing the right and left edges 302 and 304 of the touch panel 3H.

Figure 33:
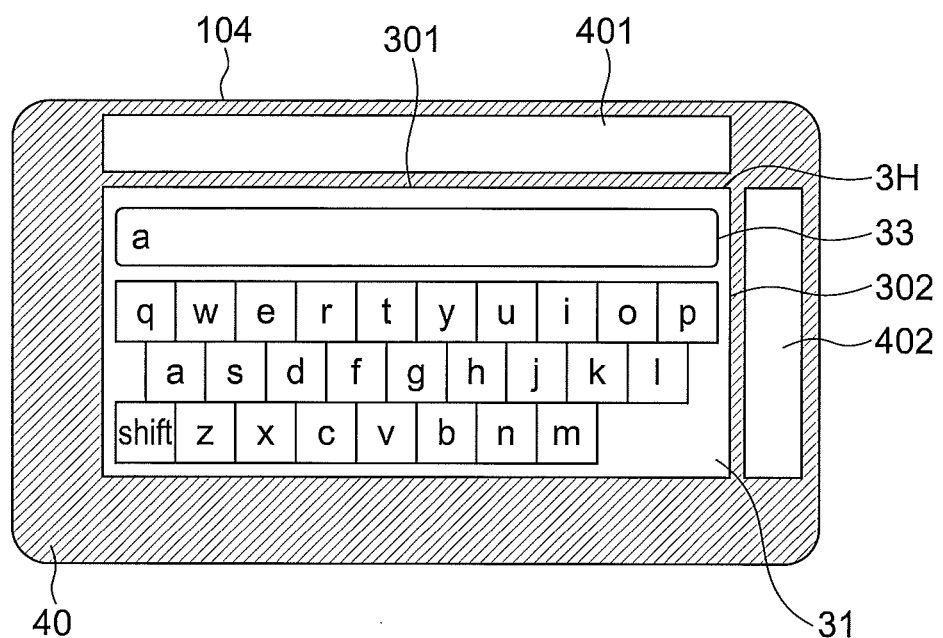
FIG. 33 is a view showing a third modification of the image processing apparatus according to the seventh embodiment.
Figure 34:
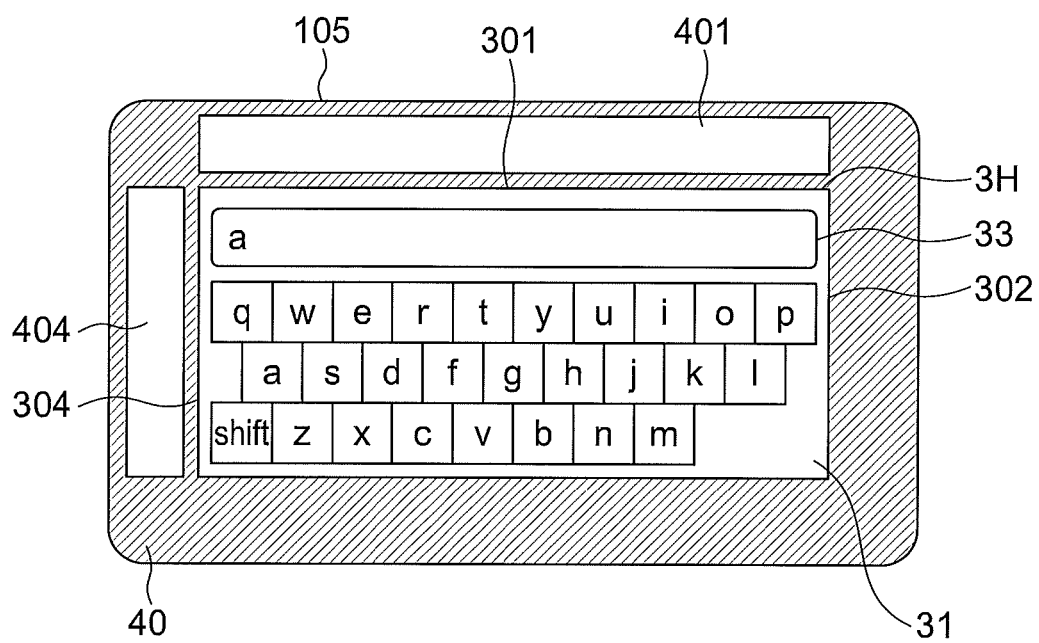
FIG. 34 is a view showing a fourth modification of the image processing apparatus according to the seventh embodiment.

In an image processing apparatus 104 of a third modification shown in FIG. 33, the operation reception portions 401 and 402 are disposed on upper and right sides of the touch panel 3H. In other words, the operation reception portions 401 and 402 are disposed on positions facing the upper and right edges 301 and 302 of the touch panel 3H. Further, in an image processing apparatus 105 of a fourth modification shown in FIG. 34, the operation reception portions 401 and 404 are disposed on upper and left sides of the touch panel 3H. In other words, the operation reception portions 401 and 404 are disposed on positions facing the upper and left edges 301 and 304 of the touch panel 3H.

Figure 35:
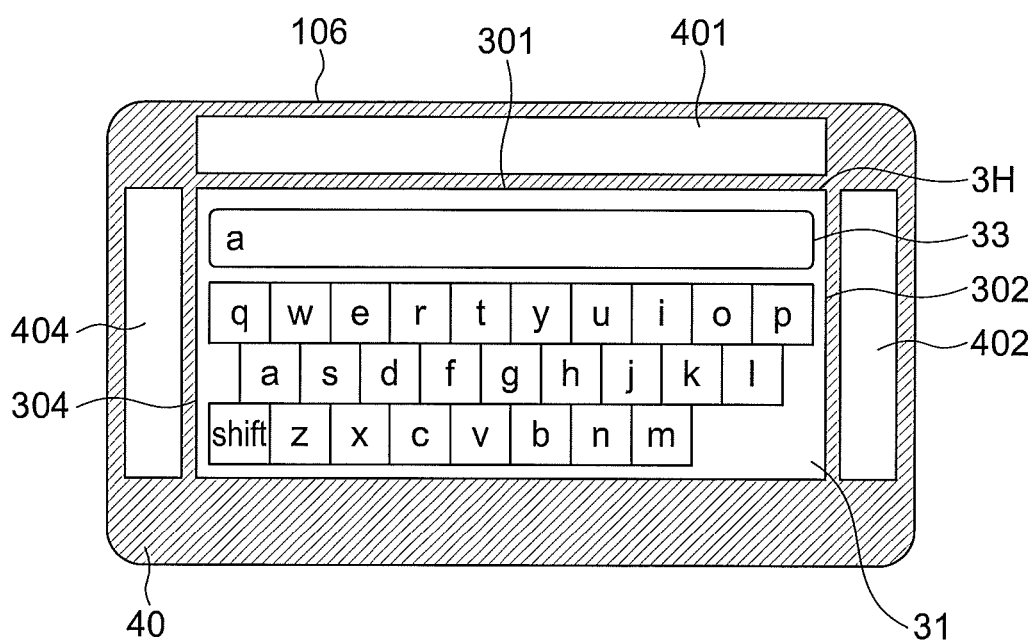
FIG. 35 is a view showing a fifth modification of the image processing apparatus according to the seventh embodiment.
Figure 36:
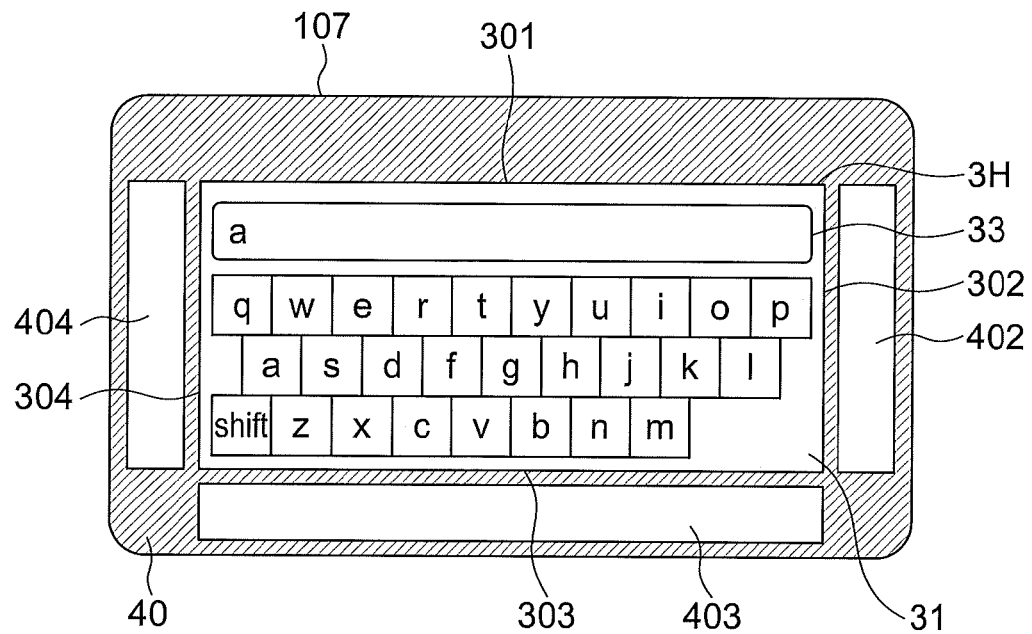
FIG. 36 is a view showing a sixth modification of the image processing apparatus according to the seventh embodiment.

In an image processing apparatus 106 of a fifth modification shown in FIG. 35, the operation reception portions 401, 402 and 404 are disposed on upper, right and left sides of the touch panel 3H. In other words, the operation reception portions 401, 402 and 404 are disposed on positions facing the upper, right and left edges 301, 302 and 304 of the touch panel 3H. Further, in an image processing apparatus 107 of a sixth modification shown in FIG. 36, the operation reception portions 402, 403 and 404 are disposed on right, lower and left sides of the touch panel 3H. In other words, the operation reception portions 402, 403 and 404 are disposed on positions facing the right, lower and left edges 302, 303 and 304 of the touch panel 3H.

In the seventh embodiment and modifications thereof, the position facing the edge of the touch panel 3H indicates a position facing an imaginary straight line along the edge. For example, in FIG. 37, the position facing the upper edge 301 of the touch panel 3H indicates a position facing an imaginary straight line L1 along the upper edge 301. Further, the position facing the imaginary straight line L1 along the upper edge 301 indicates a position shifted from the imaginary straight line L1 in a direction shown by an arrow A (i.e., in a direction away from the touch panel 3H).

Figure 37:
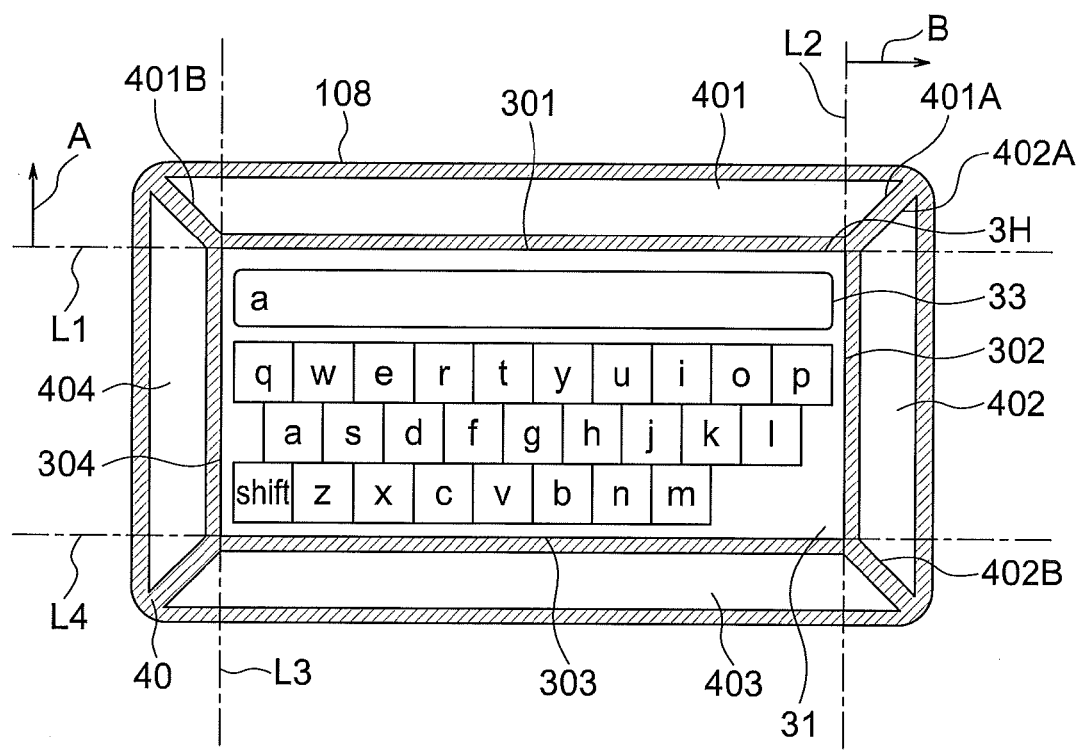
FIG. 37 is a view showing a seventh modification of the image processing apparatus according to the seventh embodiment.

In an image processing apparatus 108 of a seventh modification shown in FIG. 37, an end portion 401A of the operation reception portion 401 in the longitudinal direction is disposed on a position facing the imaginary straight line L1 along the upper edge 301 of the touch panel 3H, and is also disposed on a position facing the imaginary straight line L2 along the right edge 302. The other end portion 401B of the operation reception portion 401 is disposed on a position facing the imaginary straight line L1 along the upper edge 301 of the touch panel 3H, and is also disposed on a position facing the imaginary straight line L3 along the left edge 304. Although the end portions 401A and 401B extend at about 45 degrees with respect to the imaginary straight line L1, angles of the end portions 401A and 401B are not limited to about 45 degrees.

Further, an end portion 402A of the operation reception portion 402 in the longitudinal direction is disposed on a position facing the imaginary straight line L2 along the right edge 302 of the touch panel 3H, and is also disposed on a position facing the imaginary straight line L1 along the upper edge 301. The other end portion 402B of the operation reception portion 402 is disposed on a position facing the imaginary straight line L2 along the right edge 302 of the touch panel 3H, and is also disposed on a position facing the imaginary straight line L4 along the lower edge 303. Although the end portions 402A and 402B extend at about 45 degrees with respect to the imaginary straight line L2, angles of the end portions 402A and 402B are not limited to about 45 degrees.

In this modification, the operation reception portion 403 has a symmetrical shape with the operation reception portion 401 in the vertical direction. The operation reception portion 404 has a symmetrical shape with the operation reception portion 402 in the lateral direction.

As described above, according to the seventh embodiment of the present invention, the first region (i.e., the key display portion 31) is disposed on the touch panel 3H, and the second region (i.e., the operation reception portions 401 through 404) is disposed on the casing portion 40. Therefore, operability of the image processing apparatuses 101 through 108 can be enhanced by effectively utilizing a space of the casing portion 40.

In the above described embodiments, the image processing apparatuses are operated by the touch panel only. However, the present invention is applicable to an image processing apparatus which is operated by the touch panel and a hard key.

Any combination of the spirits and configurations of the first through seventh embodiments provides a certain effect. For example, it is also possible that the second region is provided on both of the touch panel 3 and the casing portion 40.

The present invention is applicable to an image processing apparatus such as an image forming apparatus (including a multifunction peripheral), a mobile terminal or a PDA (Personal Digital Assistance).

While the preferred embodiments of the present invention have been illustrated in detail, it should be apparent that modifications and improvements may be made to the invention without departing from the spirit and scope of the invention as described in the following claims.

What is claimed is:

1. An information processing apparatus, comprising:
    a first region;
    a first display region disposed in the first region, a key for an operation being displayed on the first display region;
    a second region disposed outside the first region, the second region being configured to receive an operation; and
    a second display region configured to display information based on the operation on the first display region and the operation on the second region,
    wherein, in a state where information corresponding to a touched key of the first display region is displayed on the second display region, the second display region changes information displayed on the second display region corresponding to the touched key of the first display region every time the second region is touched.

2. The information processing apparatus according to claim 1, further comprising a touch panel,
    wherein the touch panel includes the first display region, the second region and the second display region.

3. The information processing apparatus according to claim 1, further comprising a touch panel and a casing portion disposed along a periphery of the touch panel,
    wherein the first display region is displayed on the touch panel, and wherein the second region and the second display region are disposed in the casing portion.

4. The information processing apparatus according to claim 1, wherein the second region is disposed on each of at least two sides among upper, lower, left and right sides of the first region.

5. The information processing apparatus according to claim 1, wherein at least two second regions are disposed in at two positions facing each other with the first region disposed there between.

6. The information processing apparatus according to claim 1, wherein four second regions are disposed on upper, lower, left and right sides of the first region.

7. The information processing apparatus according to claim 1, wherein at least two second regions are disposed in at least two positions facing at least two edges of the first region directed in different directions.

8. The information processing apparatus according to claim 1, further comprising a control unit that controls the first display region,
    wherein, when the key of the first display region is touched, the control unit changes a region in the first region outside the touched key to the second region.

9. The information processing apparatus according to claim 1, further comprising a control unit that controls the first display region;
    wherein, when the key of the first display region is touched, the control unit changes a region in the first region outside the touched key to the second region, and divides the second region into a plurality of sections, and
    wherein the control unit causes the second display region to display different information based on which the plurality of sections of the second region is operated.

10. The information processing apparatus according to claim 1, wherein the second display region determines display contents after a touch is released from the first display region.

11. The information processing apparatus according to claim 1, further comprising a function switching unit that switches functions of the second display region.

12. An image forming apparatus configured as the information processing apparatus according to claim 1.

13. The image forming apparatus according to claim 12, further comprising an image forming section and an image reading section,
    wherein operational conditions of the image forming section and the image reading section are set or changed by the operation on the second display region.

14. The information processing apparatus according to claim 1, wherein the key is a letter key.

15. The information processing apparatus according to claim 1, wherein the information displayed on the second display region corresponding to the touched key of the first display region is first information;
    wherein, when the second region is touched once in a state where the key of the first display region is touched, the second display region displays second information instead of the first information; and
    wherein, when the second region is touched again in a state where the key of the first display region is touched, the second display region displays the first information instead of the second information.

16. The information processing apparatus according to claim 1, wherein the information displayed on the second display region corresponding to the touched key of the first display region is first information;
    wherein, when the second region is touched once in a state where the key of the first display region is touched, the second display region displays second information instead of the first information; and
    wherein, when the second region is touched again in a state where the key of the first display region is touched, the second display region displays third information instead of the second information.

17. The information processing apparatus according to claim 1, wherein, while the key of the first display region is touched in a state where the information corresponding to the touched key of the first display region is displayed on the second display region, the second display region changes the information displayed on the second display region corresponding to the touched key of the first display region every time the second region is touched.

18. The information processing apparatus according to claim 1, wherein, when the second region is touched a plurality of times, the information displayed on the second display region returns to original information.

19. The information processing apparatus according to claim 1, further comprising a touch panel and a casing portion disposed outside the touch panel,
    wherein the first region is disposed in the touch panel, and
    wherein the second region is disposed in the casing portion.

20. The information processing apparatus according to claim 1, further comprising:
    a touch panel;
    a casing portion disposed outside the touch panel; and
    an operation reception portion disposed in the casing portion,
    wherein the first region is disposed in the touch panel, and wherein the second region is disposed in the operation reception portion.

21. The information processing apparatus according to claim 1, wherein a plurality of the keys are disposed in the first region;
wherein the first region is a rectangular region surrounding the plurality of keys; and
wherein the first region and the second region do not overlap each other.

22. The information processing apparatus according to claim 21, wherein the second region is disposed on an upper side of the first region.

23. The information processing apparatus according to claim 21, wherein the second region is disposed on a lower side of the first region.

24. The information processing apparatus according to claim 21, wherein the second region is disposed on a left side of the first region.

25. The information processing apparatus according to claim 21, wherein the second region is disposed on a right side of the first region.

26. A display method, comprising:
displaying information on a second display region when a letter key disposed in a first display region in a first region is touched, the information corresponding to the letter key; and
changing the information displayed on the second display region corresponding to a touched letter key of the first display region every time a second region outside the first region is touched in a state where the information corresponding to the touched letter key of the first display region is displayed on the second display region.

27. The display method according to claim 26, further comprising the steps of:
changing a region in the first region outside the touched letter key to the second region;
dividing the second region into a plurality of sections, and
displaying information based on which of the plurality of sections of the second region is touched.

28. The display method according to claim 26, wherein at least two second regions are disposed in at two positions facing each other with the first region disposed there between.

29. The display method according to claim 26, wherein four second regions are disposed on upper, lower, left and right sides of the first region.

30. The display method according to claim 26, wherein the second display region determines display contents after a touch is released from the first display region.

31. The display method according to claim 26, wherein the information displayed on the second display region corresponding to the touched key of the first display region is first information, and wherein the display method further comprises:
displaying second information on the second display region instead of the first information when the second region is touched once in a state where the key of the first display region is touched, and
displaying the first information on the second display region instead of the second information when the second region is touched again in a state where the key of the first display region is touched.

32. The display method according to claim 26, wherein the information displayed on the second display region corresponding to the touched key of the first display region is first information, and wherein the display method further comprises:
displaying second information on the second display region instead of the first information when the second region is touched once in a state where the key of the first display region is touched, and
displaying third information on the second display region instead of the second information when the second region is touched again in a state where the key of the first display region is touched.

33. The display method according to claim 26, wherein, in the changing step, the information displayed on the second display region corresponding to the touched letter key of the first display region is changed every time the second region outside the first region is touched while the letter key is touched in a state where the information corresponding to the touched letter key of the first display region is displayed on the second display region.

34. The display method according to claim 26, wherein, in the changing step, when the second region is touched a plurality of times, the information displayed on the second display region returns to original information.

35. An information processing apparatus, comprising:
a first region;
a first display region disposed in the first region, a key for an operation being displayed on the first display region;
a second region disposed outside the first region; and
a second display region configured to display information,
wherein when the key of the first display region receives an operation, the second display region displays first information being an object of conversion corresponding to the key that receives the operation;
wherein when the second region receives an operation in a state where the second display region displays the first information, the second display region displays second information instead of the first information;
wherein when the second region receives an operation in a state where the second display region displays the second information, the second display region displays the first information instead of the second information.

36. The information processing apparatus according to claim 35, wherein the second region is disposed on each of at least two sides among upper, lower, left and right sides of the first region.

37. The information processing apparatus according to claim 35, further comprising a touch panel and a casing portion disposed outside the touch panel,
wherein the first region is disposed in the touch panel, and
wherein the second region is disposed in the casing portion.

38. The information processing apparatus according to claim 35, further comprising:
a touch panel;
a casing portion disposed outside the touch panel; and
an operation reception portion disposed in the casing portion,
wherein the first region is disposed in the touch panel, and
wherein the second region is disposed in the operation reception portion.

39. The information processing apparatus according to claim 38, wherein the second region is disposed on an upper side of the first region.

40. The information processing apparatus according to claim 38, wherein the second region is disposed on a lower side of the first region.

41. The information processing apparatus according to claim 38, wherein the second region is disposed on a left side of the first region.

42. The information processing apparatus according to claim 38, wherein the second region is disposed on a right side of the first region.

43. The information processing apparatus according to claim 35, wherein a plurality of the keys are disposed in the first region;

wherein the first region is a rectangular region surrounding the plurality of the keys; and wherein the first region and the second region do not overlap each other.

44. The information processing apparatus according to claim 35, wherein the second information corresponds to the key of the first display region that receives the operation, and is different from the first information.

\* \* \* \* \*